United States Patent
Shimasaki et al.

(10) Patent No.: US 9,067,470 B2
(45) Date of Patent: Jun. 30, 2015

(54) HYDRAULIC SHOCK ABSORBER

(71) Applicant: SHOWA CORPORATION, Saitama (JP)

(72) Inventors: Masao Shimasaki, Shizuoka (JP); Kimitoshi Sato, Shizuoka (JP); Yuji Ohuchi, Shizuoka (JP); Masakazu Kuwahara, Shizuoka (JP); Tatsuya Takahashi, Shizuoka (JP); Takatoshi Ohmi, Shizuoka (JP); Tadashi Hachisuka, Shizuoka (JP); Yosuke Murakami, Shizuoka (JP)

(73) Assignee: SHOWA CORPORATION, Saitama (JP)

( * ) Notice: Subject to any disclaimer, the term of this patent is extended or adjusted under 35 U.S.C. 154(b) by 125 days.

(21) Appl. No.: 13/775,858

(22) Filed: Feb. 25, 2013

(65) Prior Publication Data

US 2013/0285300 A1 Oct. 31, 2013

(30) Foreign Application Priority Data

Apr. 27, 2012 (JP) ................... 2012-102544

(51) Int. Cl.
| | |
|---|---|
| *F16F 9/48* | (2006.01) |
| *B60G 15/06* | (2006.01) |
| *F16F 9/00* | (2006.01) |
| *B62K 25/08* | (2006.01) |
| *F16F 1/12* | (2006.01) |
| *B62K 25/04* | (2006.01) |

(52) U.S. Cl.
CPC .............. *B60G 15/06* (2013.01); *B60G 15/061* (2013.01); *F16F 9/00* (2013.01); *B60G 2202/30* (2013.01); *B62K 25/08* (2013.01); *F16F 1/121* (2013.01); *F16F 2230/186* (2013.01); *B62K 2025/048* (2013.01)

(58) Field of Classification Search
CPC ....... F16F 9/3207; F16F 9/3221; F16F 9/443; F16F 9/486; B60G 15/061
USPC ............ 267/218; 188/266, 319.1, 319.2, 281, 188/284, 297, 313, 314, 315, 316, 317, 188/318; 16/61, 62, 72
See application file for complete search history.

(56) References Cited

U.S. PATENT DOCUMENTS

| | | | | |
|---|---|---|---|---|
| 2,916,281 | A | * | 12/1959 | Hehn ............................. 188/317 |
| 5,409,248 | A | * | 4/1995 | Williams ...................... 188/285 |
| 7,913,823 | B2 | * | 3/2011 | Murakami .................... 188/314 |
| 8,261,895 | B2 | * | 9/2012 | Murakami .................... 188/313 |

FOREIGN PATENT DOCUMENTS

| | | | |
|---|---|---|---|
| JP | 59099134 A | * | 6/1984 |
| JP | 2004-044669 A | | 2/2004 |

* cited by examiner

*Primary Examiner* — Thomas J Williams
(74) *Attorney, Agent, or Firm* — Keith Orum; Orum & Roth LLC

(57) ABSTRACT

An object of the present invention is to ensure that, during adjustment of a spring load by an adjuster, total fully-stretched lengths of an outer tube and an inner tube remain unchanged and the adjuster is prevented from protruding from an upper surface of a cap. In a hydraulic shock absorber 10, a spring load adjusting device 30 is configured such that an adjuster 31 is provided at an upper end portion of a vehicle body side tube 11, a push rod 33 that is moved up and down by the adjuster 31 is penetrated into a hollow portion of a hollow rod 23, a suspension spring 35 is pressurized by the push rod 33 that protrudes from the hollow portion of the hollow rod 23 to the inside of a wheel side tube 12, and the spring load of the suspension spring 35 can be adjusted by the up-and-down motion of the push rod 33 caused by the adjuster 31.

20 Claims, 12 Drawing Sheets

HYDRAULIC SHOCK ABSORBER

BACKGROUND OF THE INVENTION

1. Field of the Invention

The present invention relates to a hydraulic shock absorber suitably used in a motorcycle front fork or the like.

2. Description of the Related Art

There are hydraulic shock absorbers for a motorcycle front fork or the like, such as the hydraulic shock absorber described in Japanese Patent Application Laid-open No. 2004-44669, in which a wheel side inner tube is slidably inserted into a vehicle body side outer tube, a partition wall member is provided on an inner circumference of the inner tube, an operating oil chamber is defined below the partition wall member and an oil reservoir chamber is defined above the partition wall member, a piston rod mounted on the outer tube side is penetrated through the partition wall member and inserted into the operating oil chamber, a piston that slidably moves in the operating oil chamber is provided on a tip portion of the piston rod, the operating oil chamber is partitioned by the piston on both sides of the piston into a rod side oil chamber that houses the piston rod and a piston side oil chamber that does not house the piston rod, a suspension spring is arranged in the piston side oil chamber inside the inner tube, and the hydraulic shock absorber has a spring load adjusting device that adjusts a spring load of the suspension spring.

In the hydraulic shock absorber described above, the spring load adjusting device screws an adjuster to a cap fixed to an upper end portion of the outer tube and fixes the piston rod to a lower end portion of the adjuster inserted into the oil reservoir chamber, and the piston on the tip portion of the piston rod pressurizes the suspension spring via a spring collar from a lower end surface facing the piston side oil chamber. By screwingly moving the adjuster, the piston rod and the piston are moved up and down relative to the outer tube. The spring load of the suspension spring is adjusted by this up-and-down motion.

In addition, with the hydraulic shock absorber described in Japanese Patent Application Laid-open No. 2004-44669, a rebound spring is arranged around the piston rod in the rod side oil chamber inside the inner tube, a maximum tension stroke upon maximum tension of the outer tube and the inner tube is restricted by the rebound spring, which is back-supported by the piston provided on the piston rod, as the rebound spring abuts the partition wall member provided in the inner tube and, as a result, total fully-stretched lengths of the outer tube and the inner tube are regulated.

Patent Document: Japanese Patent Application Laid-open No. 2004-44669

SUMMARY OF THE INVENTION

However, with the hydraulic shock absorber described in Japanese Patent Application Laid-open No. 2004-44669, the piston of the piston rod which restricts a maximum tension stroke moves up and down relative to the outer tube during adjustment of a spring load by a screwing movement of the adjuster and, as a result, total fully-stretched lengths of the outer tube and the inner tube change.

In addition, with the hydraulic shock absorber described in Japanese Patent Application Laid-open No. 2004-44669, the adjuster screwingly moves to the cap fixed to the upper end portion of the outer tube and the adjuster ends up protruding upward from an upper surface of the cap.

An object of the present invention is to ensure that, during adjustment of a spring load by an adjuster, total fully-stretched lengths of an outer tube and an inner tube remain unchanged and the adjuster is prevented from protruding from an upper surface of a cap.

The invention is a hydraulic shock absorber in which a vehicle body side tube and a wheel side tube are slidably fitted to each other; a hollow rod mounted to the vehicle body side tube is inserted inside the wheel side tube; and a suspension spring is arranged inside the wheel side tube, the hydraulic shock absorber including a spring load adjusting device that adjusts a spring load of the suspension spring, wherein stopper means for restricting a maximum tension stroke is provided around the hollow rod inside the vehicle body side tube and the wheel side tube, and the spring load adjusting device is configured such that an adjuster is provided at an upper end portion of the vehicle body side tube, a push rod that is moved up and down by the adjuster is penetrated into a hollow portion of the hollow rod, the suspension spring is pressurized by the push rod that protrudes from the hollow portion of the hollow rod to the inside of the wheel side tube, and the spring load of the suspension spring can be adjusted by the up-and-down motion of the push rod caused by the adjuster.

A further embodiment of the invention is a hydraulic shock absorber in which a vehicle body side tube and a wheel side tube are slidably fitted to each other; a hollow rod mounted to the vehicle body side tube is inserted into an operating oil chamber inside the wheel side tube, a piston that slidably moves in the operating oil chamber is provided at a tip portion of the hollow rod, the operating oil chamber is partitioned by the piston on both sides of the piston into a rod side oil chamber that houses the hollow rod and a piston side oil chamber that does not house the hollow rod; and a suspension spring is arranged in the piston side oil chamber inside the wheel side tube, the hydraulic shock absorber including a spring load adjusting device that adjusts a spring load of the suspension spring, wherein stopper means for restricting a maximum tension stroke is provided around the hollow rod inside the vehicle body side tube and the wheel side tube, and the spring load adjusting device is configured such that an adjuster is provided at an upper end portion of the vehicle body side tube, a push rod that is moved up and down by the adjuster is penetrated into a hollow portion of the hollow rod, the suspension spring is pressurized by the push rod that protrudes from the hollow portion of the hollow rod into the piston side oil chamber, and the spring load of the suspension spring can be adjusted by the up-and-down motion of the push rod caused by the adjuster.

A further embodiment of the invention is a hydraulic shock absorber in which an inner tube that is a wheel side tube is slidably fitted into an outer tube that is a vehicle body side tube; a partition wall member is provided on an inner circumference of the inner tube such that an operating oil chamber is defined below the partition wall member and an oil reservoir chamber is defined above the partition wall member; a hollow rod mounted to the outer tube is penetrated through the partition wall member and inserted into the operating oil chamber, a piston that slidably moves in the operating oil chamber is provided at a tip portion of the hollow rod, and the operating oil chamber is partitioned by the piston on both sides of the piston into a rod side oil chamber that houses the hollow rod and a piston side oil chamber that does not house the hollow rod; and a suspension spring is arranged in the piston side oil chamber inside the inner tube, the hydraulic shock absorber including a spring load adjusting device that adjusts a spring load of the suspension spring, wherein stopper means is provided around the hollow rod in the rod side oil chamber inside the inner tube so that, upon maximum tension, the stopper means provided around the hollow rod abuts the partition wall member to thereby enable a maximum tension stroke to be restricted, and the spring load adjusting device is configured such that an adjuster is provided at an upper end portion of the outer tube, a push rod that is moved up and down by the adjuster is penetrated into a hollow portion of the hollow rod, the suspension spring is pressurized by the push rod that protrudes from the hollow portion of the hollow rod into the piston side oil chamber, and the spring load of the suspension spring can be adjusted by the up-and-down motion of the push rod caused by the adjuster.

A further embodiment of the invention is a hydraulic shock absorber in which a vehicle body side tube and a wheel side tube are slidably fitted to each other; a hollow rod mounted to the vehicle body side tube is inserted into an operating oil chamber of a damper cylinder erected in the wheel side tube, a piston that slidably moves in the operating oil chamber is provided at a tip portion of the hollow rod, the operating oil chamber is partitioned by the piston on both sides of the piston into a rod side oil chamber that houses the hollow rod and a piston side oil chamber that does not house the hollow rod; and a suspension spring is arranged in the piston side oil chamber inside the damper cylinder, the hydraulic shock absorber including a spring load adjusting device that adjusts a spring load of the suspension spring, wherein stopper means is provided around the hollow rod in the rod side oil chamber inside the damper cylinder so that, upon maximum tension, the stopper means provided around the hollow rod abuts a rod guide of the damper cylinder to thereby enable a maximum tension stroke to be restricted, and the spring load adjusting device is configured such that an adjuster is provided at an upper end portion of the vehicle body side tube, a push rod that is moved up and down by the adjuster is penetrated into a hollow portion of the hollow rod, the suspension spring is pressurized by the push rod that protrudes from the hollow portion of the hollow rod to the inside of the wheel side tube, and the spring load of the suspension spring can be adjusted by the up-and-down motion of the push rod caused by the adjuster.

In a further embodiment of the invention an upper end portion of the hollow rod is fixed to a cap that is fixed to an upper end opening of the vehicle body side tube, the adjuster is pivotally supported by a pivot hole of the cap, a non-circular head portion of an adjusting bolt is engaged with a non-circular hole of the adjuster so as to be non-rotatable but movable in an axial direction, a threaded shaft of the adjusting bolt is screwed into a screw hole of a coupling cylinder, the coupling cylinder being substantially integrated with the cap, and a lower end surface of the threaded shaft of the adjusting bolt abuts an upper end surface of a push rod provided in the hollow portion of the hollow rod.

In a further embodiment of the invention the stopper means provided around the hollow rod is constituted by a rebound spring that is back-supported by a spring bearing supported by an outer circumference of the hollow rod.

In a further embodiment of the invention an annular ring is attached with play in an outer circumferential groove of the push rod, and the annular ring of the push rod is engaged with a coupling hole of a spring bearing provided at an upper end portion of the suspension spring.

In a further embodiment of the invention the spring bearing is made up of a spring bearing main body placed on the upper end portion of the suspension spring and a joint locked by a locking hole of the spring bearing main body, and the coupling hole is formed in the joint.

According to the invention, the spring load adjusting device is configured such that the adjuster is provided at the upper end portion of the vehicle body side tube, the push rod that is moved up and down by the adjuster is penetrated into the hollow portion of the hollow rod, the suspension spring is pressurized by the push rod that protrudes from the hollow portion of the hollow rod to the inside of the wheel side tube, and the spring load of the suspension spring can be adjusted by the up-and-down motion of the push rod caused by the adjuster.

Accordingly, even if the push rod moves up and down relative to the vehicle body side tube during adjustment of the spring load by the adjuster, there is no up-and-down motion of the hollow rod. Therefore, the stopper means provided around the hollow rod so as to restrict the maximum tension stroke does not move up and down relative to the vehicle body side tube during adjustment of the spring load and, as a result, total fully-stretched lengths of the vehicle body side tube and the wheel side tube remain unchanged.

According to the further embodiment of the invention, the spring load adjusting device is configured such that the adjuster is provided at the upper end portion of the vehicle body side tube, the push rod that is moved up and down by the adjuster is penetrated into the hollow portion of the hollow rod, the suspension spring is pressurized by the push rod that protrudes from the hollow portion of the hollow rod into the piston side oil chamber, and the spring load of the suspension spring can be adjusted by the up-and-down motion of the push rod caused by the adjuster.

Accordingly, even if the push rod moves up and down relative to the vehicle body side tube during adjustment of the spring load by the adjuster, there is no up-and-down motion of the hollow rod. Therefore, the stopper means provided around the hollow rod so as to restrict the maximum tension stroke does not move up and down relative to the vehicle body side tube during adjustment of the spring load and, as a result, total fully-stretched lengths of the vehicle body side tube and the wheel side tube remain unchanged.

Accordingly to the further embodiment of the invention the spring load adjusting device is configured such that the adjuster is provided at the upper end portion of the outer tube, the push rod that is moved up and down by the adjuster is penetrated into the hollow portion of the hollow rod, the suspension spring is pressurized by the push rod that protrudes from the hollow portion of the hollow rod into the piston side oil chamber, and the spring load of the suspension spring can be adjusted by the up-and-down motion of the push rod caused by the adjuster.

Accordingly, even if the push rod moves up and down relative to the outer tube that is the vehicle body side tube during adjustment of the spring load by the adjuster, there is no up-and-down motion of the hollow rod. Therefore, the stopper means provided around the hollow rod so as to restrict the maximum tension stroke does not move up and down relative to the outer tube that is the vehicle body side tube during adjustment of the spring load and, as a result, total fully-stretched lengths of the outer tube that is the vehicle body side tube and the inner tube that is the wheel side tube remain unchanged.

According to the further embodiment of the invention, the spring load adjusting device is configured such that the adjuster is provided at the upper end portion of the vehicle body side tube, the push rod that is moved up and down by the adjuster is penetrated into the hollow portion of the hollow rod, the suspension spring is pressurized by the push rod that protrudes from the hollow portion of the hollow rod to the inside of tithe wheel side tube, and the spring load of the suspension spring can be adjusted by the up-and-down motion of the push rod caused by the adjuster.

Accordingly, even if the push rod moves up and down relative to the vehicle body side tube during adjustment of the spring load by the adjuster, there is no up-and-down motion of the hollow rod. Therefore, the stopper means provided around the hollow rod so as to restrict a maximum tension stroke does not move up and down relative to the vehicle body side tube during adjustment of the spring load and, as a result, total fully-stretched lengths of the vehicle body side tube and the wheel side tube remain unchanged.

According to the further embodiment of the invention, the upper end portion of the hollow rod is fixed to the cap that is fixed to the upper end opening of the vehicle body side tube, the adjuster is pivotally supported by the pivot hole of the cap, the non-circular head portion of the adjusting bolt is engaged with the non-circular hole of the adjuster so as to be non-rotatable but movable in the axial direction, the threaded shaft of the adjusting bolt is screwed into the screw hole of the coupling cylinder, the coupling cylinder being substantially integrated with the cap, and the lower end surface of the threaded shaft of the adjusting bolt abuts the upper end surface of the push rod provided in the hollow portion of the hollow rod.

Accordingly, the adjuster rotates while being pivotally supported by the cap to move the push rod up and down. Therefore, the adjuster can be prevented from protruding from the upper surface of the cap during adjustment of the spring load by the adjuster.

According to the further embodiment of the invention, the stopper means provided around the hollow rod is constituted by the rebound spring that is back-supported by the spring bearing supported by the outer circumference of the hollow rod.

Accordingly, upon maximum tension of the vehicle body side tube and the wheel side tube, the rebound spring provided on the outer circumference of the hollow rod restricts the maximum tension stroke and, as a result, total fully-stretched lengths of the vehicle body side tube and the wheel side tube are regulated.

According to the further embodiment of the invention, the annular ring is attached with play in the outer circumferential groove of the push rod, and the annular ring of the push rod is engaged with the coupling hole of the spring bearing provided at the upper end portion of the suspension spring.

Accordingly, in an assembly stage of the hydraulic shock absorber, since the annular ring attached to the push rod is engaged with the coupling hole of the spring bearing, the spring bearing is prevented from separating or detaching from the push rod.

Furthermore, in an activation stage of the hydraulic shock absorber, the annular ring engaged with the coupling hole of the spring bearing is attached with play in the outer circumferential groove of the push rod. Therefore, the spring bearing that is seated on the upper end surface of the stretching suspension spring is capable of following a swing or the like of the upper end surface of the suspension spring without being constrained by the push rod. In addition, a bending load that is applied to the push rod by the spring bearing can be reduced or eliminated.

According to the further embodiment of the invention, the spring bearing is made up of the spring bearing main body placed on the upper end portion of the suspension spring and the joint locked by the locking hole of the spring bearing main body, and the coupling hole is formed in the joint.

Accordingly, the spring bearing can be configured by two components including the spring bearing main body made of resin or the like and the joint made of metal or the like. The spring bearing main body that is directly seated on the suspension spring can rotate relative to the joint and absorb torsion that accompanies stretching of the suspension spring. In addition, lightening can be achieved by creating the spring bearing main body using resin. Durability can be improved by creating the joint using metal.

DESCRIPTION OF THE PREFERRED EMBODIMENTS (First Embodiment) (FIGS. 1 to 6)

Figure 1:
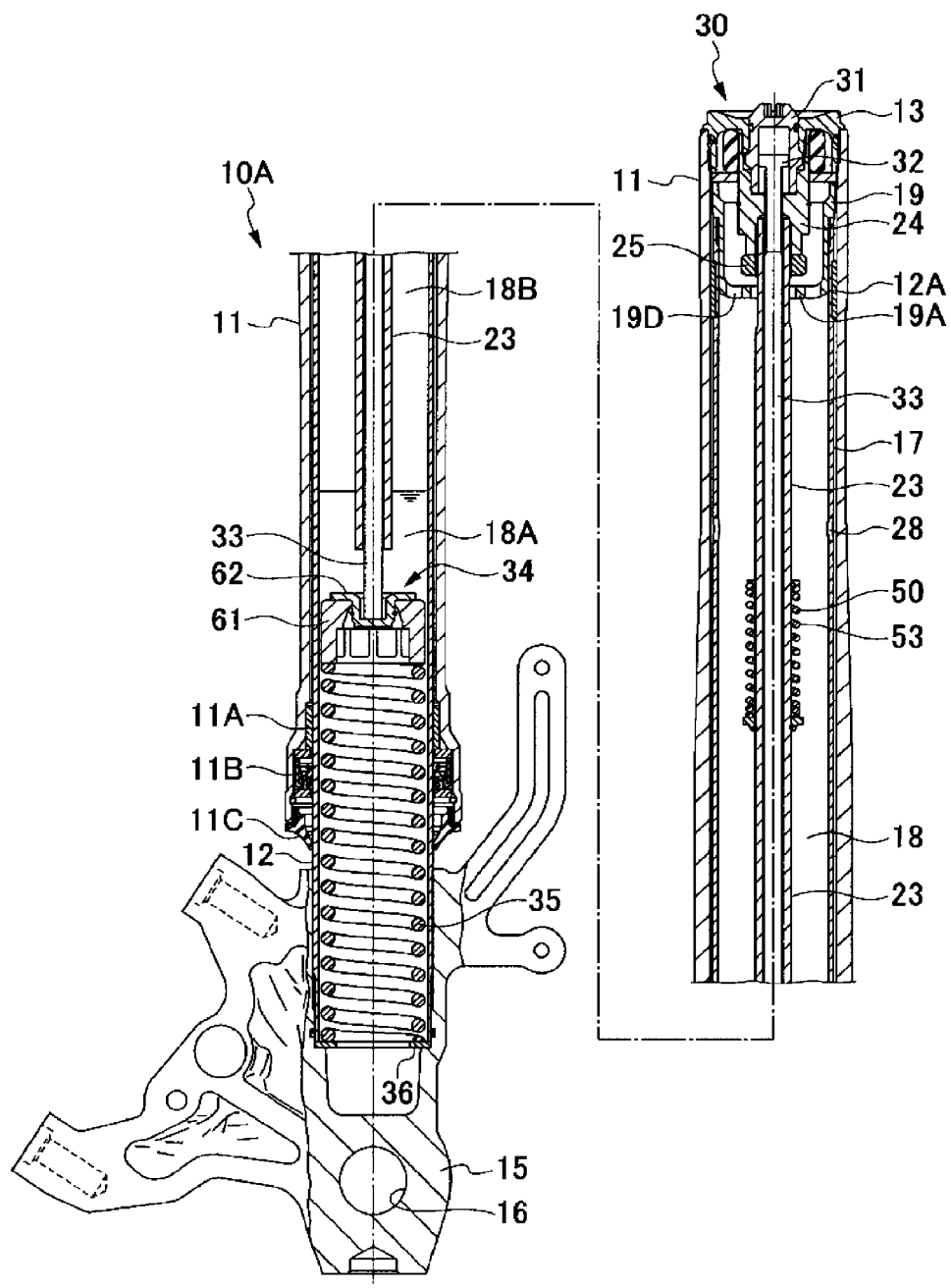
FIG. 1 is a sectional view showing an entire hydraulic shock absorber according to a first embodiment.

A hydraulic shock absorber 10A shown in FIG. 1 constitutes at least one leg among left and right legs of a front fork of a motorcycle and the like, and is a spring leg which does not have a built-in damper but has a built-in suspension spring 35. In this case, the other left or right leg of the front fork is constituted by a damper leg having a built-in damper. Alternatively, both of the left and right legs may be spring legs.

The hydraulic shock absorber 10A constitutes an inverted front fork having a vehicle body side tube as an outer tube 11 and a wheel side tube as an inner tube 12. Alternatively, the hydraulic shock absorber 10A may constitute an upright front fork having a vehicle body side tube as an inner tube and a wheel side tube as an outer tube.

Figure 2:
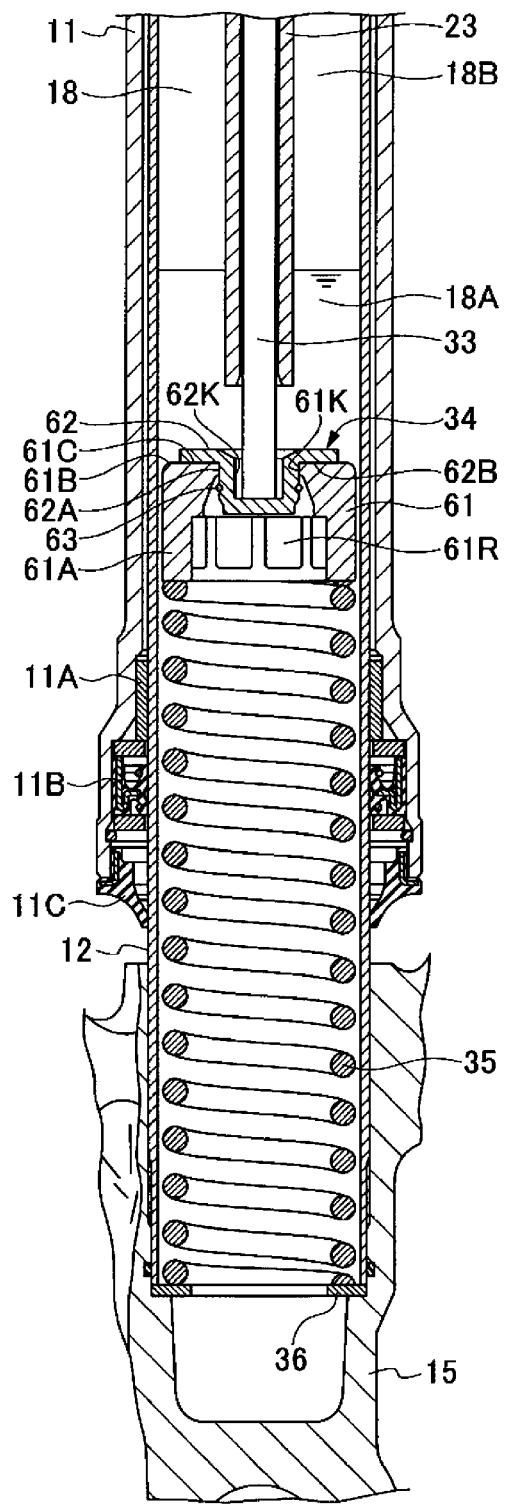
FIG. 2 is a sectional view of a lower part of FIG. 1.
Figure 3:
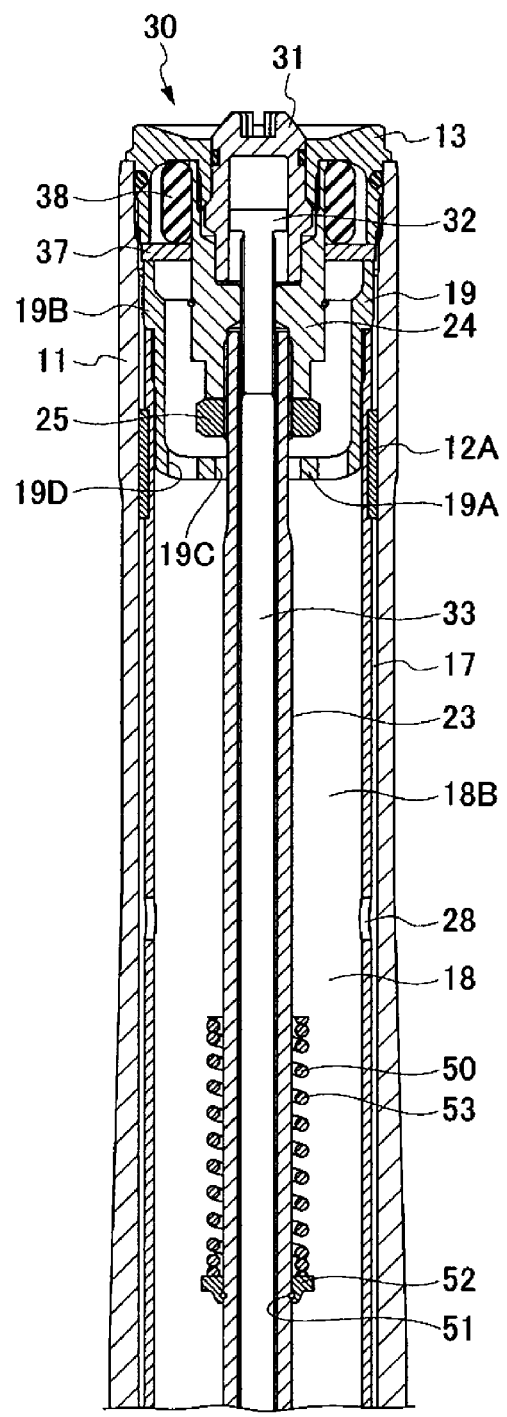
FIG. 3 is a sectional view of an upper part of FIG. 1.

As shown in FIGS. 1 to 3, in the hydraulic shock absorber 10A, the inner tube 12 is slidably fitted into the outer tube 11 via a lower guide bush 11A fixed to an inner circumference of a lower end opening of the outer tube 11 and an upper guide bush 12A fixed to an outer circumference of an upper end opening of the inner tube 12. Reference character 11B denotes an oil seal and 11C denotes a dust seal. An outer cylinder portion 13A of a cap 13 is screwed and fixed in a sealed state created by an O ring to an upper end opening of the outer tube 11, and a vehicle body side mounting member is provided on an outer circumference of the outer tube 11. A bottom bracket 15 is attached by insertion and screwed in a sealed state created by an O ring to a lower end opening of the inner tube 12, and a wheel side mounting portion 16 is provided on the bottom bracket 15.

In the hydraulic shock absorber 10A, an annular oil chamber 17 is partitioned by the two guide bushes 11A and 12A between the inner circumference of the outer tube 11 and the outer circumference of the inner tube 12.

The hydraulic shock absorber 10A uses a space communicating from an upper end side inner circumference of the outer tube 11 to a lower end side inner circumference of the inner tube 12 as an oil reservoir chamber 18. A lower region of the oil reservoir chamber 18 is an oil chamber 18A and an upper region of the oil reservoir chamber 18 is an air chamber 18B. The oil reservoir chamber 18 secures a certain volume for the oil chamber 18A and, by extension, secures a volume for the air chamber 18B for generating an air spring (an air reaction force). The annular oil chamber 17 and the oil reservoir chamber 18 are communicated with each other by an oil hole 28 provided in the inner tube 12 and supply lubricating oil to the bushes 11A and 12A which partition the annular oil chamber 17 and to the oil seal 11B.

The hydraulic shock absorber 10A absorbs an impact force that a vehicle receives from the road surface using a springing force of a suspension spring 35 (to be described later) and the air spring created by the air chamber 18B of the oil reservoir chamber 18.

In the hydraulic shock absorber 10A, a cup-like partition wall member 19 is provided on an upper end side inner circumference of the inner tube 12. The partition wall member 19 screws a cylindrical portion 19B that extends upward from an outer circumference of a partition portion 19A to the inner circumference of the inner tube 12 and positions the partition portion 19A below a tip portion of the inner tube 12. In the partition portion 19A, The partition wall member 19 has a communicating hole 19D which communicates the upper and lower oil reservoir chambers 18 (the air chamber 18B) which sandwich the partition portion 19A with each other.

In the hydraulic shock absorber 10A, a hollow rod 23 mounted on the side of the outer tube 11 is penetrated through a through hole 19C provided on an inner circumference of the partition portion 19A of the partition wall member 19 and inserted into the inner tube 12. Specifically, an upward screw hole of a coupling cylinder 24 is screwed to and integrated with an outer circumferential screw portion of an inner cylinder portion 13B of the cap 13, and an upper end portion of the hollow rod 23 is screwed to a downward screw hole at center of a lower end portion of the coupling cylinder 24 and then fixed by a lock nut 25. The hollow rod 23 functions as a guide rod which slidably supports a push rod 33 (to be described later).

In the hydraulic shock absorber 10A, a suspension spring 35 is arranged in the oil reservoir chamber 18 (the oil chamber 18A) inside the inner tube 12. The hydraulic shock absorber 10A has a spring load adjusting device 30 which adjusts a spring load of the suspension spring 35.

Figure 4:
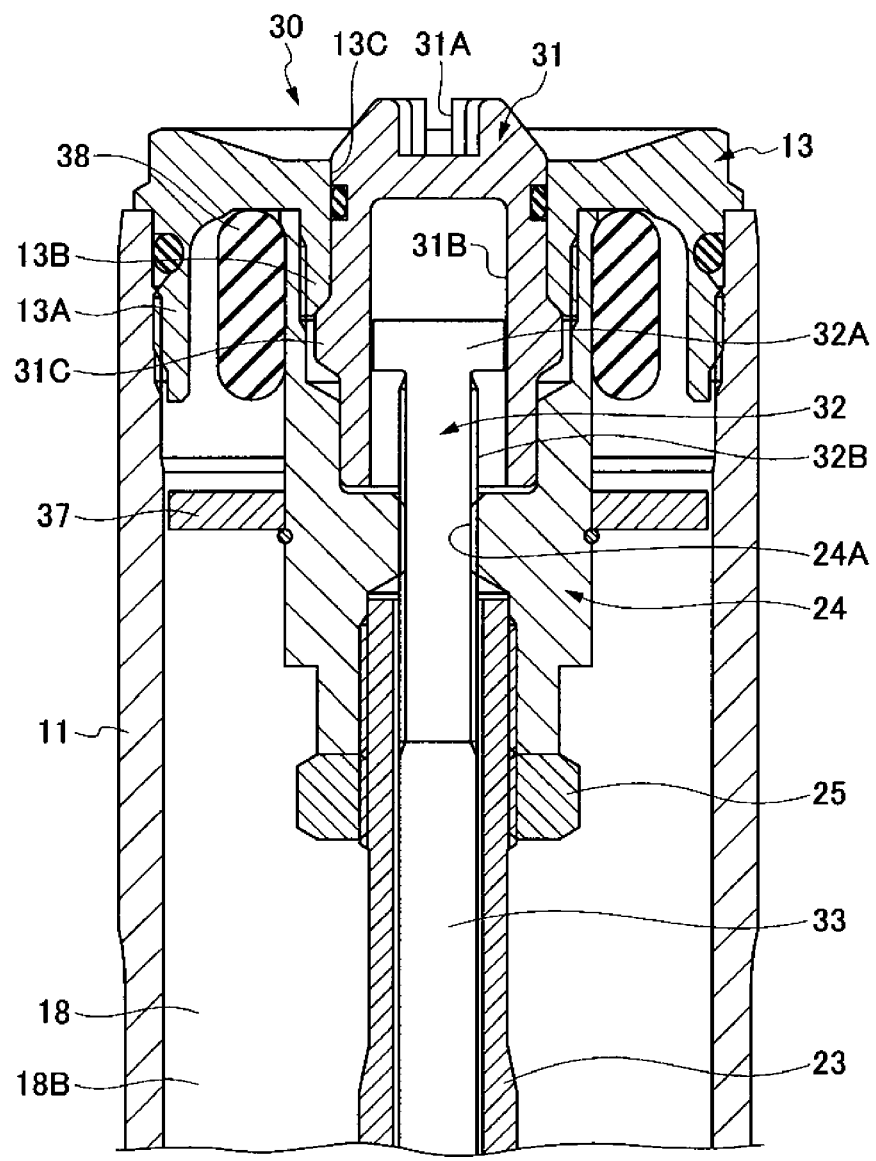
FIG. 4 is a sectional view showing a spring load adjusting device.

As shown in FIG. 4, in the spring load adjusting device 30, an adjuster 31 is pivotally supported in a sealed state created by an O ring in a pivot hole 13C provided in a penetrating manner in an inner cylinder portion 13B of the cap 13. The adjuster 31 has an operating portion 31A at an upper end facing the outside and a non-circular hole 31B with a square hole shape or the like which opens at a lower end facing the side of the oil reservoir chamber 18 (the air chamber 18B). The adjuster 31 is attached by insertion into the pivot hole 13C of the inner cylinder portion 13B of the cap 13 from the side of the oil reservoir chamber 18 (the air chamber 18B) and, in a state where an outer circumferential flange 31C of the adjuster 31 is butted against a lower end surface of the inner cylinder portion 13B of the cap 13, the adjuster 31 is prevented from detaching and is held by an upward depression of the coupling cylinder 24 which is fixed by being screwed into the outer circumferential screw portion of the inner cylinder portion 13B of the cap 13 from the side of the oil reservoir chamber 18 (the air chamber 18B).

In the spring load adjusting device 30, a non-circular head portion 32A with a square head shape or the like of an adjusting bolt 32 is engaged with the non-circular hole 31B of the adjuster 31 so that the non-circular head portion 32A of the adjusting bolt 32 becomes non-rotatable but movable in an axial direction. In addition, a threaded shaft 32B of the adjusting bolt 32 is screwed into a screw hole 24A of the coupling cylinder 24 that is substantially integrated with the cap 13. The screw hole 24A is provided on the coupling cylinder 24 halfway between the upward depression and the downward screw hole described earlier. When the adjuster 31 rotates due to an operating force applied to the operating portion 31A, the adjusting bolt 32 screwingly moves up and down in the screw hole 24A of the coupling cylinder 24 while being prevented from rotating by the non-circular hole 31B of the adjuster 31.

In the spring load adjusting device 30, a lower end surface of the threaded shaft 32B of the adjusting bolt 32 abuts an upper end surface of the push rod 33 penetrating into a hollow portion of the hollow rod 23. Accordingly, the adjusting bolt 32 which is moved up and down by the rotation of the adjuster 31 abuts the upper end surface of the push rod 33, and a lower end portion of the push rod 33 which protrudes from the hollow portion of the hollow rod 23 into the oil reservoir chamber 18 (the oil chamber 18A) pressurizes the suspension spring 35 via an upper spring bearing 34. The suspension spring 35 is interposed between the upper spring bearing 34 and a lower spring bearing 36 which is formed by the bottom bracket 15 and which is seated at a bottom portion of the inner tube 12, and the adjuster 31 adjusts a spring load of the suspension spring 35 by the up-and-down motion of the push rod 33. The hydraulic shock absorber 10A absorbs an impact force that is received from the road surface during driving of a vehicle with a stretching vibration of the suspension spring 35.

With the spring load adjusting device 30, due to a reaction force of compression of the suspension spring 35, the upper spring bearing 34 constantly abuts the lower end surface of the push rod 33 and the upper end surface of the push rod 33 constantly abuts the lower end surface of the threaded shaft 32B of the adjusting bolt 32.

Moreover, as shown in FIG. 2, the upper spring bearing 34 is constituted by a spring bearing main body 61 arranged on an upper end portion of the suspension spring 35 and a joint 62 fitted to and locked by a central locking hole 61K of the spring bearing main body 61. In the spring bearing main body 61, a lower end surface of a cylinder portion 61A having a ceilinged cylindrical shape is seated on an upper end surface of the suspension spring 35. The spring bearing main body 61 has an oil path 61R penetrating to the inside and outside of the cylinder portion 61A. In the spring bearing main body 61, a fitting outer circumferential surface 62A of the joint 62 is fitted to the straight central locking hole 61K that opens on a central axis of an upper surface 61C of a ceiling portion 61B, an installation plane 62B of the joint 62 is brought into close contact with the upper surface 61C, and the joint 62 is locked by a stopper ring 63 engaged with the fitting outer circumferential surface 62A of the joint 62 protruding from the central locking hole 61K of the spring bearing main body 61 so that the joint 62 can be prevented from detaching by the central locking hole 61K. In addition, the lower end surface of the push rod 33 is in colliding contact with a central depression 62K of the joint 62 of the upper spring bearing 34 to enable pressurization of the suspension spring 35.

In the hydraulic shock absorber 10A, a stopper rubber 38 which is abutted by the upper end portion of the cylindrical portion 19B of the partition wall member 19 provided in the inner tube 12 via a washer 37 at a maximum compression stroke is fastened to a bottom surface of the annular depression between the outer cylinder portion 13A and the inner cylinder portion 13B of the cap 13, and the maximum compression stroke is restricted by the stopper rubber 38.

In the hydraulic shock absorber 10A, stopper means 50 is provided around the hollow rod 23 in the oil reservoir chamber 18 (the air chamber 18B) inside the inner tube 12. Upon maximum tension, the hydraulic shock absorber 10A causes the stopper means 50 provided around the hollow rod 23 to abut the partition portion 19A of the partition wall member 19 to restrict a maximum tension stroke. In the present embodiment, a spring bearing 52 is supported on a stopper ring 51 engaged with an outer circumference of the hollow rod 23, and a rebound spring 53 that is back-supported by the spring bearing 52 is used as the stopper means 50. Upon maximum tension of the hydraulic shock absorber 10A, the partition wall member 19 pressurizes the rebound spring 53 to restrict a maximum tension stroke.

According to the present embodiment, the following operational advantages can be produced.

(a) A spring load adjusting device 30 is configured such that an adjuster 31 is provided at an upper end portion of an outer tube 11, a push rod 33 that is moved up and down by the adjuster 31 is penetrated into a hollow portion of a hollow rod 23, a suspension spring 35 is pressurized by the push rod 33 that protrudes from the hollow portion of the hollow rod 23 to the inside of an inner tube 12, and a spring load of the suspension spring 35 can be adjusted by the up-and-down motion of the push rod 33 caused by the adjuster 31.

Accordingly, even if the push rod 33 moves up and down relative to the outer tube 11 during adjustment of a spring load by the adjuster 31, there is no up-and-down motion of the hollow rod 23. Therefore, stopper means 50 provided around the hollow rod 23 so as to restrict a maximum tension stroke does not move up and down relative to the outer tube 11 during adjustment of a spring load and, as a result, total fully-stretched lengths of the outer tube 11 and the inner tube 12 remain unchanged.

(b) An upper end portion of a hollow rod 23 is fixed to a cap 13 that is fixed to an upper end opening of the outer tube 11, an adjuster 31 is pivotally supported by a pivot hole 13C of the cap 13, a non-circular head portion 32A of an adjusting bolt 32 is engaged with a non-circular hole 31B of the adjuster 31 so that the non-circular head portion 32A of the adjusting bolt 32 becomes non-rotatable but movable in an axial direction, a threaded shaft 32B of the adjusting bolt 32 is screwed into a screw hole 24A of a coupling cylinder 24 that is substantially integrated with the cap 13, and a lower end surface of the threaded shaft 32B of the adjusting bolt 32 abuts an upper end surface of a push rod 33 in a hollow portion of the hollow rod 23.

Accordingly, the adjuster 31 rotates while being pivotally supported by the cap 13 to move the push rod 33 up and down. Therefore, the adjuster 31 can be prevented from protruding from the upper surface of the cap 13 during adjustment of a spring load by the adjuster 31.

(c) Stopper means 50 provided around the hollow rod is constituted by a rebound spring 53 that is back-supported by a spring bearing 52 supported by an outer circumference of the hollow rod 23.

Accordingly, upon maximum tension of the outer tube 11 and the inner tube 12, the rebound spring 53 provided on the outer circumference of the hollow rod 23 abuts the partition wall member 19 and restricts a maximum tension stroke and, as a result, total fully-stretched lengths of the outer tube 11 and the inner tube 12 are regulated.

Figure 5:
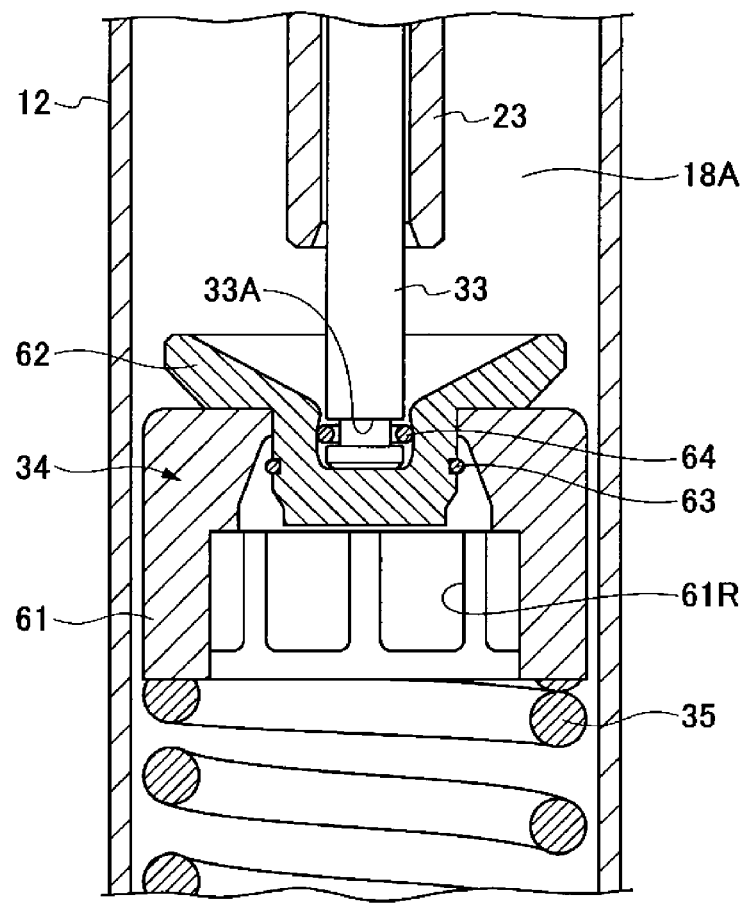
FIG. 5 is a sectional view showing a spring bearing.
Figure 6:
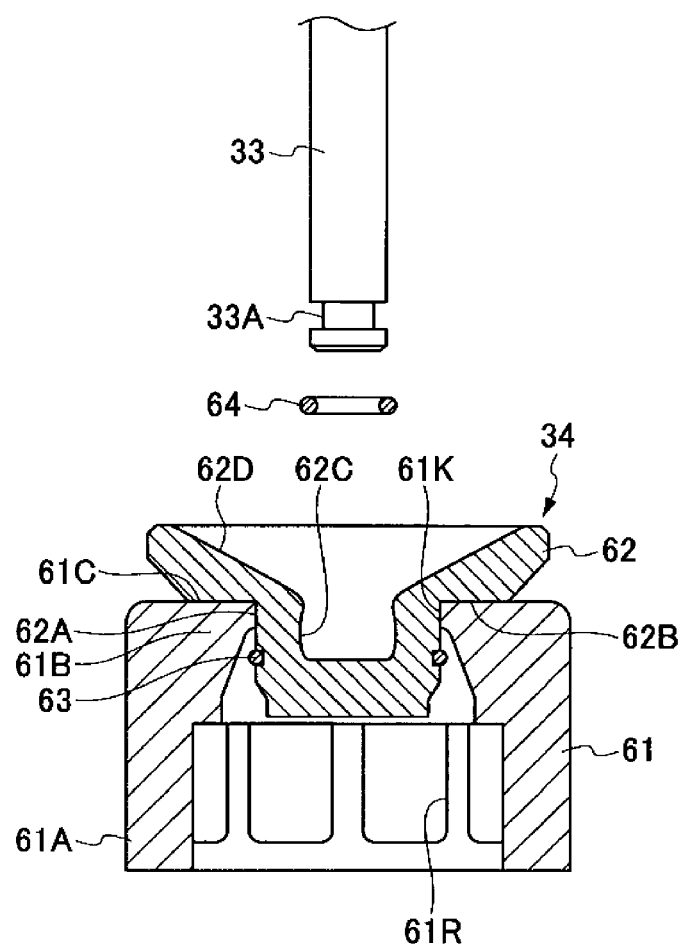
FIG. 6 is an exploded view showing a coupling structure of a push rod and a spring bearing.

FIGS. 5 and 6 show a modification of a coupling structure of the push rod 33 and the upper spring bearing 34. The upper spring bearing 34 is constituted by a spring bearing main body 61 arranged on an upper end portion of a suspension spring 35 and a joint 62 fitted to and locked by a central locking hole 61K of the spring bearing main body 61. In the spring bearing main body 61, a lower end surface of a cylinder portion 61A having a ceilinged cylindrical shape is seated on an upper end surface of the suspension spring 35. The spring bearing main body 61 has an oil path 61R penetrating to the inside and outside of the cylinder portion 61A. In the spring bearing main body 61, a fitting outer circumferential surface 62A of the joint 62 is fitted to the straight central locking hole 61K that opens on a central axis of an upper surface 61C of a ceiling portion 61B, an installation plane 62B of the joint 62 is brought into close contact with the upper surface 61C, and the joint 62 is locked by a stopper ring 63 engaged with the fitting outer circumferential surface 62A of the joint 62 protruding from the central locking hole 61K of the spring bearing main body 61 so that the joint 62 can be prevented from detaching by the central locking hole 61K.

In the upper spring bearing 34, a depressed central coupling hole 62C is provided on a central axis of an upper surface of the joint 62. In addition, the upper spring bearing 34 has a tapered surface 62D that spreads upward from an opening end portion of the central coupling hole 62C. In the central coupling hole 62C, a hole surface on a plane including a central axis of the joint 62 is configured as an R-plane and a hole bottom diameter and an opening diameter of the central coupling hole 62C are set smaller than a hole diameter of an intermediate depth portion that is sandwiched between the hole bottom and the opening. In addition, an annular outer circumferential groove 33A is provided in a lower end portion of the push rod 33, and an annular ring 64 that is a C-shaped ring is attached with play in axial and radial directions to the outer circumferential groove 33A.

The annular ring 64 that is attached with play to the outer circumferential groove 33A of the lower end portion of the push rod 33 is engaged with the central coupling hole 62C of the joint 62 of the upper spring bearing 34 provided at the upper end portion of the suspension spring 35. At this point, the annular ring 64 attached to the annular outer circumferential groove 33A of the push rod 33 is guided by the tapered surface 62D of the joint 62 and elastically decreases in diameter while being pushed, the annular ring 64 is loaded from the opening of the central coupling hole 62C into the hole and, after being loaded, the annular ring 64 elastically increases in diameter to come into tight contact with the R-plane hole surface of the central coupling hole 62C and becomes engaged with the central coupling hole 62C. In a state where the annular ring 64 that is attached with play to the outer circumferential groove 33A of the lower end portion of the push rod 33 is engaged with the central coupling hole 62C of the joint 62 as described above, play is provided between the annular outer circumferential groove 33A of the push rod 33 and the annular ring 64 in the axial and radial directions (FIG. 5).

The mode of the push rod 33 and the upper spring bearing 34 described above according to the present embodiment produces the following operational advantages.

(d) An annular ring 64 is attached with play in an outer circumferential groove 33A in a lower end portion of the push rod 33, and the annular ring 64 of the push rod 33 is engaged with a central coupling hole 62C of a spring bearing 34 provided at an upper end portion of a suspension spring 35.

Accordingly, during an assembly stage of the hydraulic shock absorber 10A, the annular ring 64 attached to the lower end portion of the push rod 33 is engaged with the central coupling hole 62C of the spring bearing 34 and prevents the spring bearing 34 from separating or detaching from the lower end portion of the push rod 33.

In addition, due to a predetermined drawing force that is applied to the push rod 33, the annular ring 64 which is attached to the lower end portion of the push rod 33 and which is engaged with the central coupling hole 62C of the spring bearing 34 decreases in diameter while being pulled away from the R-plane hole surface of the central coupling hole 62C and allows itself to be pulled out from the central coupling hole 62C.

Furthermore, during an activation stage of the hydraulic shock absorber 10A, the annular ring 64 engaged with the central coupling hole 62C of the spring bearing 34 is attached with play in the outer circumferential groove 33A at the lower end portion of the push rod 33. Therefore, the spring bearing 34 that is seated on the upper end surface of the stretching suspension spring 35 is capable of following a swing or the like of the upper end surface of the suspension spring 35 without being constrained by the lower end portion of the push rod 33. In addition, a bending load that is applied to the push rod 33 by the spring bearing 34 can be reduced or eliminated.

(e) The spring bearing 34 is made up of a spring bearing main body 61 placed on an upper end portion of a suspension spring 35 and a joint 62 locked by a central locking hole 61K of the spring bearing main body 61, and the central coupling hole 62C is formed on the joint 62.

Accordingly, the spring bearing 34 can be configured by two components including the spring bearing main body 61 made of resin or the like and the joint 62 made of metal or the like. The spring bearing main body 61 that is directly seated on the suspension spring 35 can rotate relative to the joint 62 and absorb torsion that accompanies stretching of the suspension spring 35. In addition, lightening can be achieved by creating the spring bearing main body 61 using resin. Durability can be improved by creating the joint 62 using metal.

Figure 7:
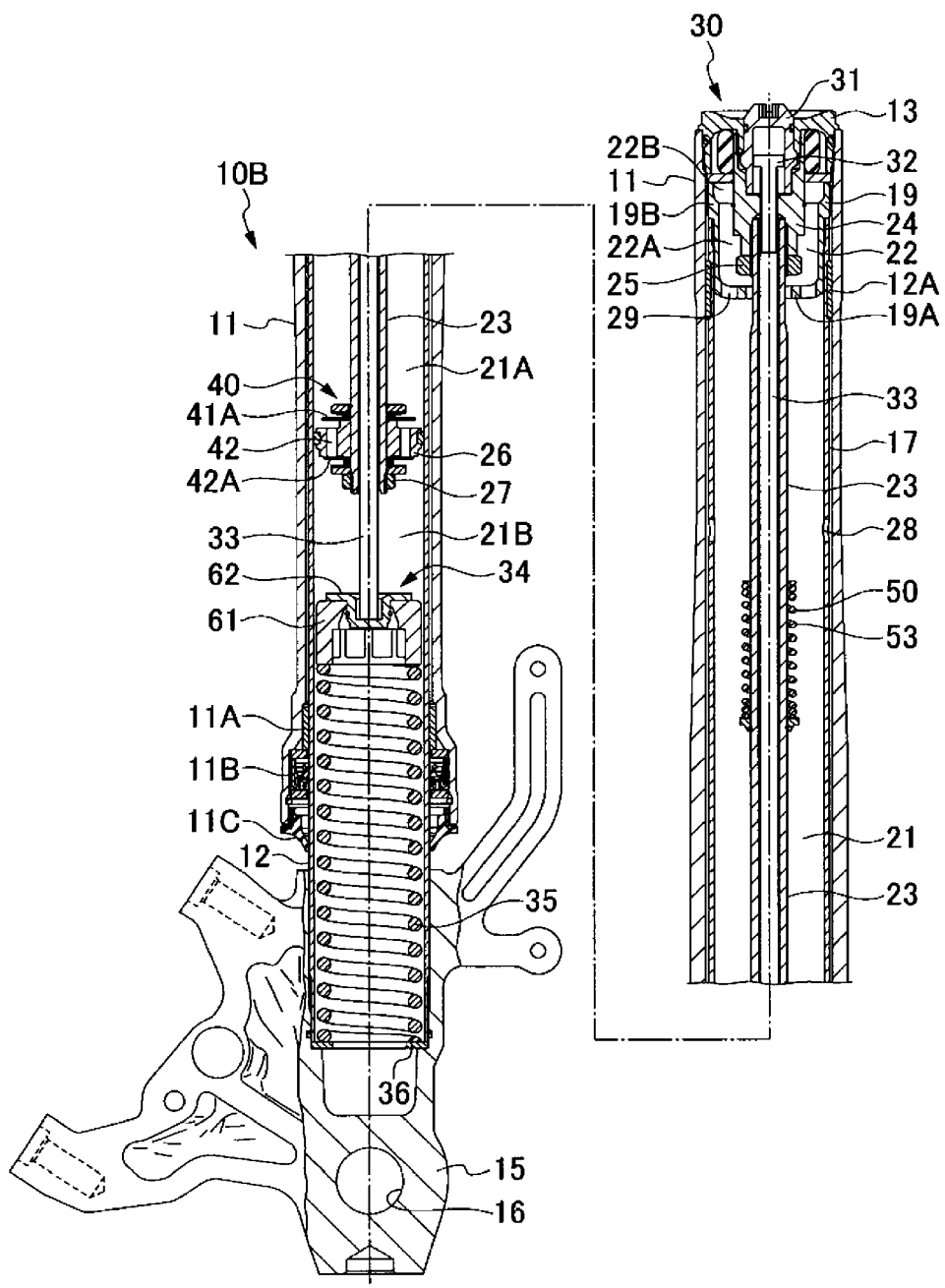
FIG. 7 is a sectional view showing an entire hydraulic shock absorber according to a second embodiment.
Figure 8:
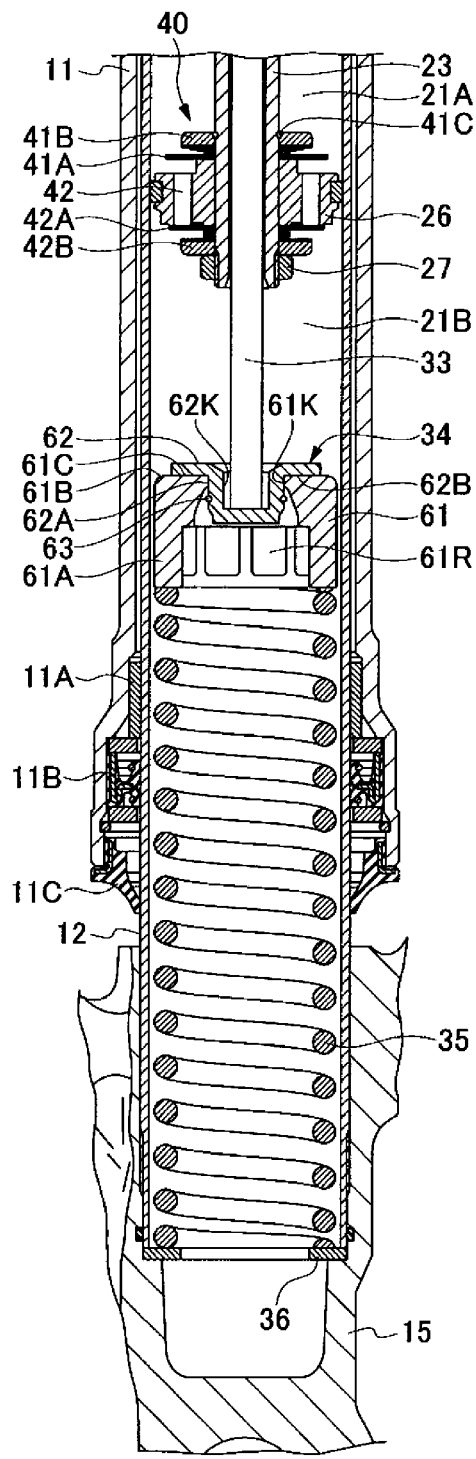
FIG. 8 is a sectional view of a lower part of FIG. 7.
Figure 9:
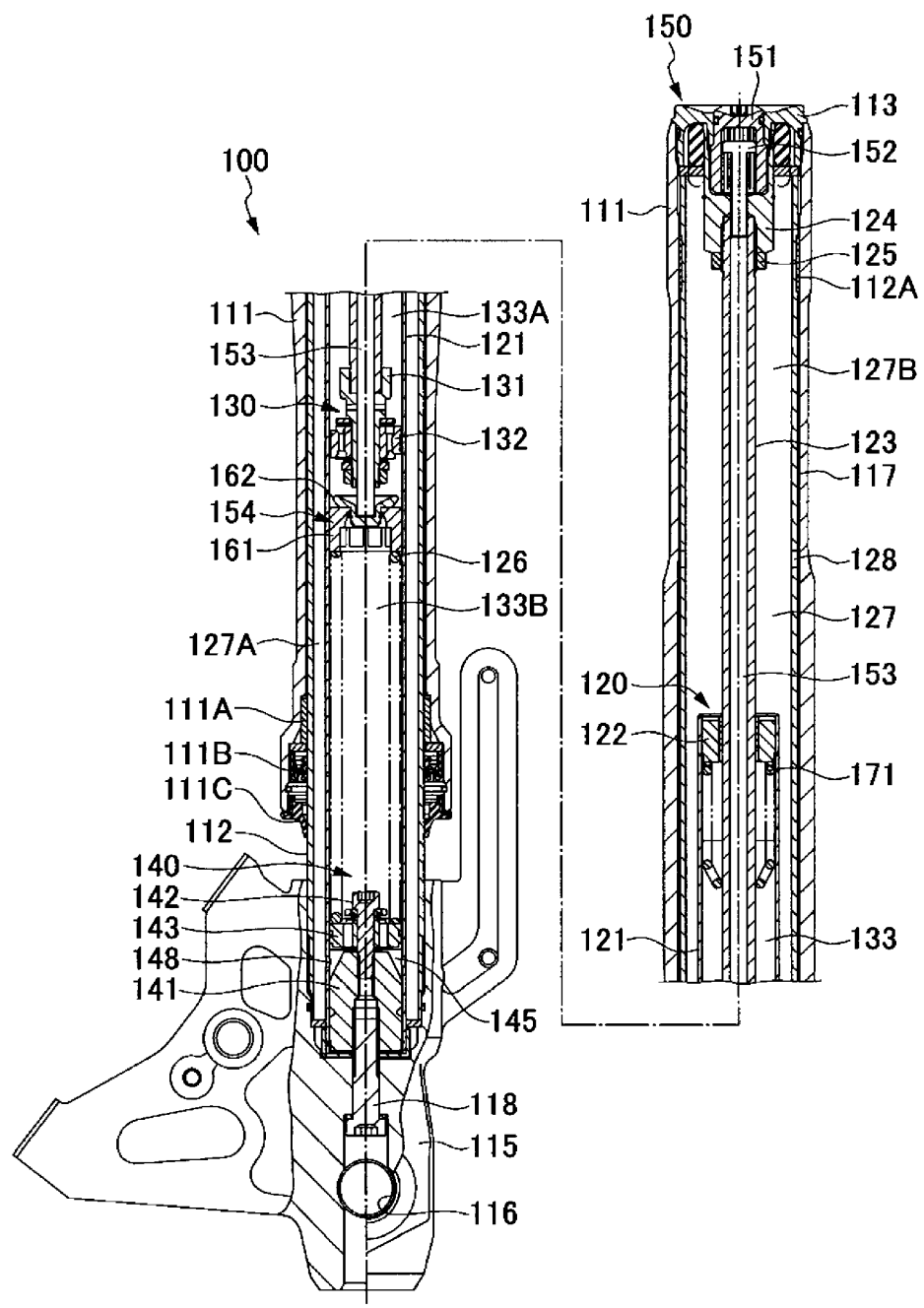
FIG. 9 is a sectional view showing an entire hydraulic shock absorber according to a third embodiment.

(Second Embodiment) (FIGS. 7 and 8)

A hydraulic shock absorber 10B according to the second embodiment shown in FIGS. 7 and 8 substantially differs from the hydraulic shock absorber 10A according to the first embodiment shown in FIGS. 1 to 6 in that an operating oil chamber 21 is defined below a partition portion 19A of a partition wall member 19 provided on an upper end side inner circumference of an inner tube 12, an oil reservoir chamber 22 is defined above the partition portion 19A, and a piston 26 which comes into sliding contact with an inner circumference of the inner tube 12 is fixed to a tip portion of a hollow rod 23. In the detailed description of the hydraulic shock absorber 10B given below, components of the hydraulic shock absorber 10B similar to those of the hydraulic shock absorber 10A will be denoted by same reference characters.

The hydraulic shock absorber 10B is an inverted front fork in which an outer tube 11 is arranged on a vehicle body side and an inner tube 12 is arranged on a wheel side, and the inner tube 12 is slidably inserted into the outer tube 11 via a lower guide bush 11A fixed to an inner circumference of a lower end opening of the outer tube 11 and an upper guide bush 12A fixed to an outer circumference of an upper end opening of the inner tube 12. Reference character 11B denotes an oil seal and 11C denotes a dust seal. An outer cylinder portion 13A of a cap 13 is screwed and fixed in a sealed state created by an O ring to an upper end opening of the outer tube 11, and a vehicle body side mounting member is provided on an outer circumference of the outer tube 11. A bottom bracket 15 is attached by insertion and screwed in a sealed state created by an O ring to a lower end opening of the inner tube 12, and a wheel side mounting portion 16 is provided on the bottom bracket 15.

In the hydraulic shock absorber 10B, an annular oil chamber 17 is partitioned by the two guide bushes 11A and 12A between the inner circumference of the outer tube 11 and the outer circumference of the inner tube 12.

In the hydraulic shock absorber 10B, a cup-like partition wall member 19 is provided on an upper end side inner circumference of the inner tube 12. An operating oil chamber 21 is defined below a partition portion 19A of the partition wall member 19 and an oil reservoir chamber 22 is defined above the partition portion 19A of the partition wall member 19. A lower region in the oil reservoir chamber 22 is an oil chamber 22A and an upper region in the oil reservoir chamber 22 is an air chamber 22B.

The partition wall member 19 screws a cylindrical portion 19B that extends upward from an outer circumference of the partition portion 19A to the inner circumference of the inner tube 12 and positions the partition portion 19A below a tip portion of the inner tube 12. Accordingly, a fitted length of the outer tube 11 and the inner tube 12 upon tension can be sufficiently secured. At the same time, a volume of the oil reservoir chamber 22 and, by extension, a volume of the air chamber 22B for generating an air spring (an air reaction force) can be secured.

The hydraulic shock absorber 10B absorbs an impact force that a vehicle receives from the road surface using a springing force of a suspension spring 35 (to be described later) and the air spring created by the air chamber 22B of the oil reservoir chamber 22.

In the hydraulic shock absorber 10B, a hollow rod 23 mounted on the side of the outer tube 11 is penetrated through a through hole 19C provided on an inner circumference of the partition portion 19A of the partition wall member 19 and inserted into the operating oil chamber 21. Specifically, an upward screw hole of a coupling cylinder 24 is screwed to and integrated with an outer circumferential screw portion of an inner cylinder portion 13B of a cap 13 inserted into the oil reservoir chamber 22, and an upper end portion of the hollow rod 23 is screwed to a downward screw hole 24A at center of a lower end portion of the coupling cylinder 24 and then fixed by a lock nut 25.

In the hydraulic shock absorber 10B, a piston 26 that is in sliding contact with the inner circumference of the inner tube 12 is fixed to a tip portion of the hollow rod 23 inserted into the operating oil chamber 21 of the inner tube 12 from the partition portion 19A of the partition wall member 19, and the oil chamber 21 is partitioned on both sides of the piston 26 into a rod side oil chamber 21A that houses the hollow rod 23 and a piston side oil chamber 21B that does not house the hollow rod 23. The piston 26 is fixed by a nut 27.

In the hydraulic shock absorber 10B, an oil hole 28 which communicates the rod side oil chamber 21A and the annular oil chamber 17 with each other is provided in the inner tube 12, and an oil hole 29 which communicates the rod side oil chamber 21A and the oil reservoir chamber 22 with each other is provided in the partition portion 19A of the partition wall member 19. Accordingly, volume compensation of the hollow rod 23 which enters and exits from the inner tube 12 is performed. In addition, lubricating oil is supplied to the bushes 11A and 12A which partition the annular oil chamber 17 and to the oil seal 11B.

In the hydraulic shock absorber 10B, a suspension spring 35 is arranged in the piston side oil chamber 21B inside the inner tube 12. The hydraulic shock absorber 10B has a spring load adjusting device 30 which adjusts a spring load of the suspension spring 35.

The spring load adjusting device 30 substantially shares the same configuration as the spring load adjusting device 30 (FIG. 4) used in the hydraulic shock absorber 10A according to the first embodiment and a description thereof will be omitted.

However, in the present embodiment, an adjuster 31 has an operating portion 31A at an upper end facing the outside and a non-circular hole 31B with a square hole shape or the like which opens at a lower end facing the side of the oil reservoir chamber 22. The adjuster 31 is attached by insertion into a pivot hole 13C of the inner cylinder portion 13B of the cap 13 from the side of the oil reservoir chamber 22 and, in a state where an outer circumferential flange 31C of the adjuster 31 is butted against a lower end surface of the inner cylinder portion 13B of the cap 13, the adjuster 31 is prevented from detaching and is held by an upward depression of the coupling cylinder 24 which is fixed by being screwed into an outer circumferential screw portion of the inner cylinder portion 13B of the cap 13 from the side of the oil reservoir chamber 22.

In addition, an adjusting bolt 32 which is moved up and down by the rotation of the adjuster 31 abuts the upper end surface of the push rod 33, and a lower end portion of the push rod 33 which protrudes from the hollow portion of the hollow rod 23 into the piston side oil chamber 21B pressurizes the suspension spring 35 via an upper spring bearing 34.

Moreover, the upper spring bearing 34 also substantially shares the same configuration as the upper spring bearing 34 (FIGS. 2, 5, and 6) used in the hydraulic shock absorber 10A according to the first embodiment and a description thereof will be omitted.

The hydraulic shock absorber 10B has a damping force generating device 40 (damping force generating means) in the piston 26.

The damping force generating device 40 has a compression side flow channel 41 (not shown) and a tension side flow channel 42. The compression side flow channel 41 is opened and closed by a compression side disk valve 41A (a compression side damping valve) which is backed up by a valve stopper 41B. The tension side flow channel 42 is opened and closed by a tension side disk valve 42A (a tension side damping valve) which is backed up by a valve stopper 42B. Moreover, the valve stopper 41B, the valve 41A, the piston 26, the valve 42A, and the valve stopper 42B constitute a valve assembly which is inserted into the hollow rod 23 and which is fixed by being sandwiched between a stopper ring 41C engaged with the hollow rod 23 and a nut 27 screwed to the hollow rod 23.

In a compression side stroke, the damping force generating device 40 generates a compression side damping force due to a flexural deformation of the compression side disk valve 41A. In addition, in a tension side stroke, the damping force generating device 40 generates a tension side damping force due to a flexural deformation of the tension side disk valve 42A. Due to the compression side damping force and the tension side damping force, stretching vibration of the suspension spring 35 is controlled.

In the hydraulic shock absorber 10B, a stopper rubber 38 which is abutted by the upper end portion of the cylindrical portion 19B of the partition wall member 19 provided in the inner tube 12 via a washer 37 at a maximum compression stroke is fastened to a bottom surface of an annular depression between the outer cylinder portion 13A and the inner cylinder portion 13B of the cap 13, and the maximum compression stroke is restricted by the stopper rubber 38.

In the hydraulic shock absorber 10B, stopper means 50 is provided around the hollow rod 23 in the rod side oil chamber 21A inside the inner tube 12. Upon maximum tension, the hydraulic shock absorber 10B causes the stopper means 50 provided around the hollow rod 23 to abut the partition portion 19A of the partition wall member 19 to restrict a maximum tension stroke. In the present embodiment, a spring bearing 52 is supported on a stopper ring 51 engaged with an outer circumference of the hollow rod 23, and a rebound spring 53 that is back-supported by the spring bearing 52 is used as the stopper means 50. Upon maximum tension of the hydraulic shock absorber 10B, the partition wall member 19 pressurizes the rebound spring 53 to restrict a maximum tension stroke.

According to the present embodiment, the following operational advantages can be produced.

(a) A spring load adjusting device 30 is configured such that an adjuster 31 is provided at an upper end portion of an outer tube 11, a push rod 33 that is moved up and down by the adjuster 31 is penetrated into a hollow portion of a hollow rod 23, a suspension spring 35 is pressurized by the push rod 33 that protrudes from the hollow portion of the hollow rod 23 to a piston side oil chamber 21B, and a spring load of the suspension spring 35 can be adjusted by the up-and-down motion of the push rod 33 caused by the adjuster 31.

Accordingly, even if the push rod 33 moves up and down relative to the outer tube 11 that is a vehicle body side tube during adjustment of a spring load by the adjuster 31, there is no up-and-down motion of the hollow rod 23. Therefore, the stopper means 50 provided around the hollow rod 23 so as to restrict a maximum tension stroke does not move up and down relative to the outer tube 11 that is a vehicle body side tube during adjustment of a spring load and, as a result, total fully-stretched lengths of the outer tube 11 that is a vehicle body side tube and an inner tube that is a wheel side tube remain unchanged.

Moreover, the present embodiment also produces the operational advantages (b) to (e) described earlier with respect to the first embodiment.

(Third Embodiment) (FIGS. 9 to 12)

A hydraulic shock absorber 100 according to the third embodiment shown in FIGS. 9 to 12 constitutes a front fork of a motorcycle or the like. The hydraulic shock absorber 100 constitutes an inverted front fork having a vehicle body side tube as an outer tube 111 and a wheel side tube as an inner tube 112. Alternatively, the hydraulic shock absorber 100 may constitute an upright front fork having a vehicle body side tube as an inner tube and a wheel side tube as an outer tube.

As shown in FIGS. 9 to 12, in the hydraulic shock absorber 100, the inner tube 112 is slidably fitted into the outer tube 111 via a lower guide bush 111A fixed to an inner circumference of a lower end opening of the outer tube 111 and an upper guide bush 112A fixed to an outer circumference of an upper end opening of the inner tube 112. Reference character 111B denotes an oil seal and 111C denotes a dust seal. An outer cylinder portion 113A of a cap 113 is screwed and fixed in a sealed state created by an O ring to the upper end opening of the outer tube 111, and a vehicle body side mounting member is provided on an outer circumference of the outer tube 111. A bottom bracket 115 is attached by insertion and screwed in a sealed state created by an O ring to the lower end opening of the inner tube 112, and a wheel side mounting portion 116 is provided on the bottom bracket 115.

In the hydraulic shock absorber 100, an annular oil chamber 117 is partitioned by the two guide bushes 111A and 112A between the inner circumference of the outer tube 111 and the outer circumference of the inner tube 112.

A lower end portion of a damper cylinder 121 of a damper 120 is attached to and erected on a bottom portion of the inner tube 112. In this case, the damper cylinder 121 is fixed and held as described later by a bottom bolt 118 inserted into the bottom bracket 115 from the outer side via a bottom piece 141 (to be described later).

In the hydraulic shock absorber 100, a hollow rod 123 mounted to the side of the outer tube 111 is passed through a rod guide 122 fixed to an upper end portion of the damper cylinder 121 and inserted into an operating oil chamber 133 inside the damper cylinder 121. Specifically, an upward screw hole of a coupling cylinder 124 is screwed to and integrated with an outer circumferential screw portion of an inner cylinder portion 113B of a cap 113 inserted into the upper end opening of the outer tube 111, and an upper end portion of the hollow rod 123 is screwed to a downward screw hole at center of a lower end portion of the coupling cylinder 124 and then fixed by a lock nut 125.

In the hydraulic shock absorber 100, a suspension spring 126 is sandwiched by and interposed between both tubes 111 and 112 in an axial direction. In the present embodiment, the suspension spring 126 is arranged inside the damper cylinder 121.

In the hydraulic shock absorber 100, an oil reservoir chamber 127 is partitioned at an outer circumferential portion of the damper cylinder 121 inside both tubes 111 and 112. A lower region in the oil reservoir chamber 127 is an oil chamber 127A and an upper region in the oil reservoir chamber 127 is an air chamber 127B. The oil reservoir chamber 127 secures a certain volume for the oil chamber 127A and, by extension, secures a volume for the air chamber 127B for generating an air spring (an air reaction force). The annular oil chamber 117 and the oil reservoir chamber 127 are communicated with each other by an oil hole 128 provided in the inner tube 112 and supply lubricating oil to the bushes 111A and 112A which partition the annular oil chamber 117 and to the oil seal 111B.

The hydraulic shock absorber 100 absorbs an impact force that a vehicle receives from the road surface using a springing force of the suspension spring 126 and the air spring created by the air chamber 127B of the oil reservoir chamber 127.

The damper 120 has a piston valve device (a tension side damping force generating device) 130 and a bottom valve device (a compression side damping force generating device) 140. Due to damping forces generated by the piston valve device 130 and the bottom valve device 140, the damper 120 suppresses stretching vibration of the outer tube 111 and the inner tube 112 which accompanies the absorption of impact force by the suspension spring 126 and the air spring.

A rod guide 122 is tightened and fixed to an upper end opening of the damper cylinder 121, and a bush 122A which guides the hollow rod 123 in sliding contact is press-fitted into the rod guide 122.

Moreover, a rebound spring 171 which is compressed by a piston holder 131 (to be described later) and produces a shock-absorbing effect upon maximum tension is held directly under the rod guide 122 on the inner circumference of the damper cylinder 121.

Hereinafter, a damping mechanism of the hydraulic shock absorber 100 will be described.

Figure 10:
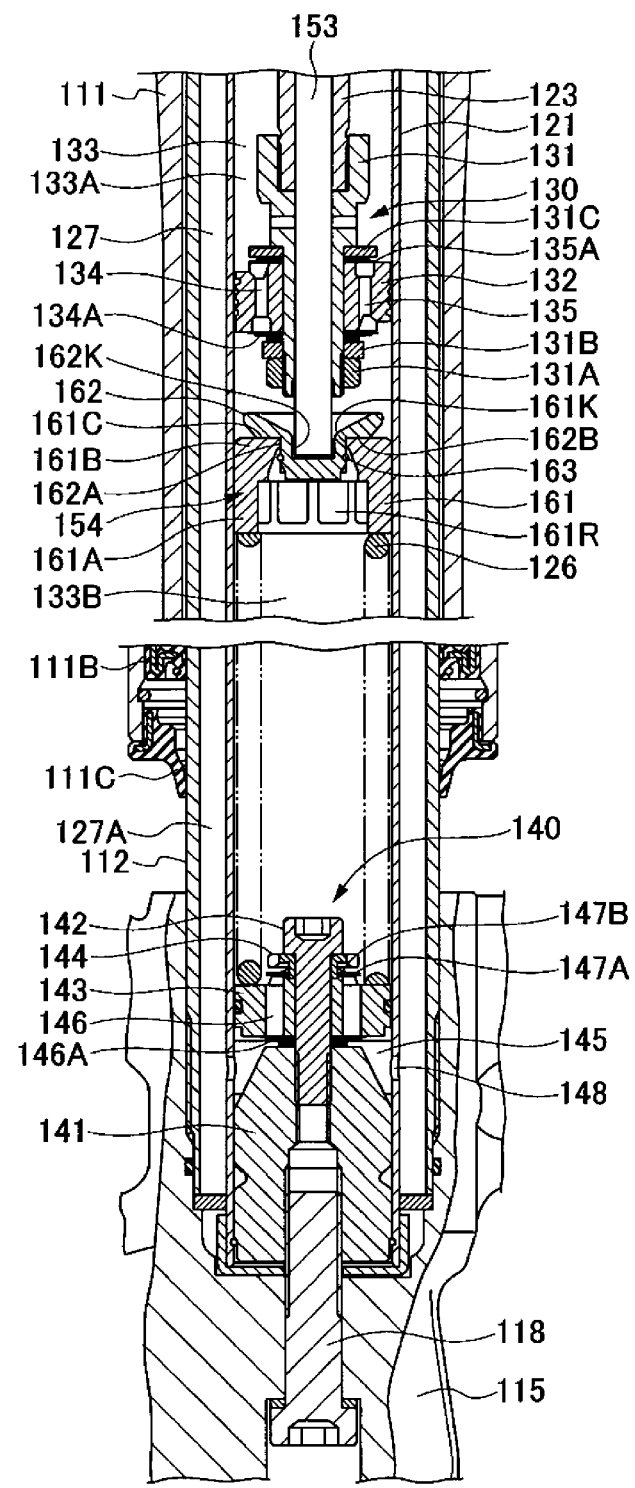
FIG. 10 is a sectional view of a lower part of FIG. 9.

(Piston Valve Device 130) (FIG. 10)

In the piston valve device 130, the piston holder 131 is fixedly attached by insertion to the tip portion of the hollow rod 123, and the piston 132 and the valve stopper 131C are attached by insertion by the nut 131A and the valve stopper 131B which are screwed to the piston holder 131. The piston 132 is in sliding contact inside the damper cylinder 121 and partitions the operating oil chamber 133 inside the damper cylinder 121 into a rod side oil chamber 133A that houses the hollow rod 123 and a piston side oil chamber 133B that does not house the hollow rod 123. The piston 132 has a tension side flow channel 134 which has a tension side valve 134A and which enables the rod side oil chamber 133A and the piston side oil chamber 133B to communicate with each other and a compression side flow channel 135 which has a compression side valve (check valve) 135A and which enables the rod side oil chamber 133A and the piston side oil chamber 133B to communicate with each other.

Therefore, upon compression of the hydraulic shock absorber 100, oil from the piston side oil chamber 133B flows along the compression side flow channel 135, opens the compression side valve 135A, and is guided to the rod side oil chamber 133A.

In addition, upon tension of the hydraulic shock absorber 100, oil from the rod side oil chamber 133A flows along the tension side flow channel 134, causes a flexural deformation of the tension side valve 134A and is guided to the piston side oil chamber 133B, and generates a tension side damping force.

(Bottom Valve Device 140) (FIG. 10)

In the bottom valve device 140, a bottom piece 141 to which the damper cylinder 121 is fixed as will be described later holds a compression side valve 146A, a valve housing 143, and a valve stopper 144 using a bolt 142. The valve stopper 144 holds a tension side valve (a check valve) 147A and a spring 147B between the valve stopper 144 and the valve housing 143. The valve housing 143 comes into close contact with an intermediate portion of the damper cylinder 121 in a liquid-tight manner and defines a bottom valve chamber 145 below the piston side oil chamber 133B. The valve housing 143 has a compression side flow channel 146 which has a compression side valve 146A and which enables the piston side oil chamber 133B and the bottom valve chamber 145 to communicate with each other and a tension side flow channel 147 (not shown) which has a tension side valve 147A and which enables the piston side oil chamber 133B and the bottom valve chamber 145 to communicate with each other. Due to an oil path 148 provided on a wall surface of the damper cylinder 121, the bottom valve chamber 145 is capable of communicating with the oil reservoir chamber 127 provided outside the damper cylinder 121.

Therefore, upon compression of the hydraulic shock absorber 100, oil corresponding to an entrance volume of the hollow rod 123 having entered the damper cylinder 121 is discharged from the piston side oil chamber 133B to the oil reservoir chamber 127 via the compression side flow channel 146, the bottom valve chamber 145, and the oil path 148 on the wall surface of the damper cylinder 121. At this point, oil flowing along the compression side flow channel 146 from the piston side oil chamber 133B causes a flexural deformation of the compression side valve 146A and is guided to the bottom valve chamber 145, and generates a compression side damping force.

Upon tension of the hydraulic shock absorber 100, oil corresponding to an exit volume of the hollow rod 123 exiting the damper cylinder 121 is returned from the oil reservoir chamber 127 to the piston side oil chamber 133B via the bottom valve chamber 145 and the tension side flow channel 147.

Therefore, the hydraulic shock absorber 100 produces a damping action as described below.

(Upon Compression)

Upon compression of the hydraulic shock absorber 100, a compression side damping force is generated at the bottom valve device 140 due to oil flowing through the compression side valve 146A of the valve housing 143. On the other hand, a damping force is hardly generated at the piston valve device 130.

(Upon Tension)

Upon tension of the hydraulic shock absorber 100, a tension side damping force is generated at the piston valve device 130 due to oil flowing through the tension side valve 134A of the piston 132. On the other hand, a damping force is hardly generated at the bottom valve device 140.

Due to the compression side and tension side damping forces, stretching vibration of the hydraulic shock absorber 100 is restricted.

In the hydraulic shock absorber 100, the suspension spring 126 is arranged inside the damper cylinder 121 on the valve housing 143 that constitutes the bottom valve device 140. The hydraulic shock absorber 100 has a spring load adjusting device 150 which adjusts a spring load of the suspension spring 126.

Figure 12:
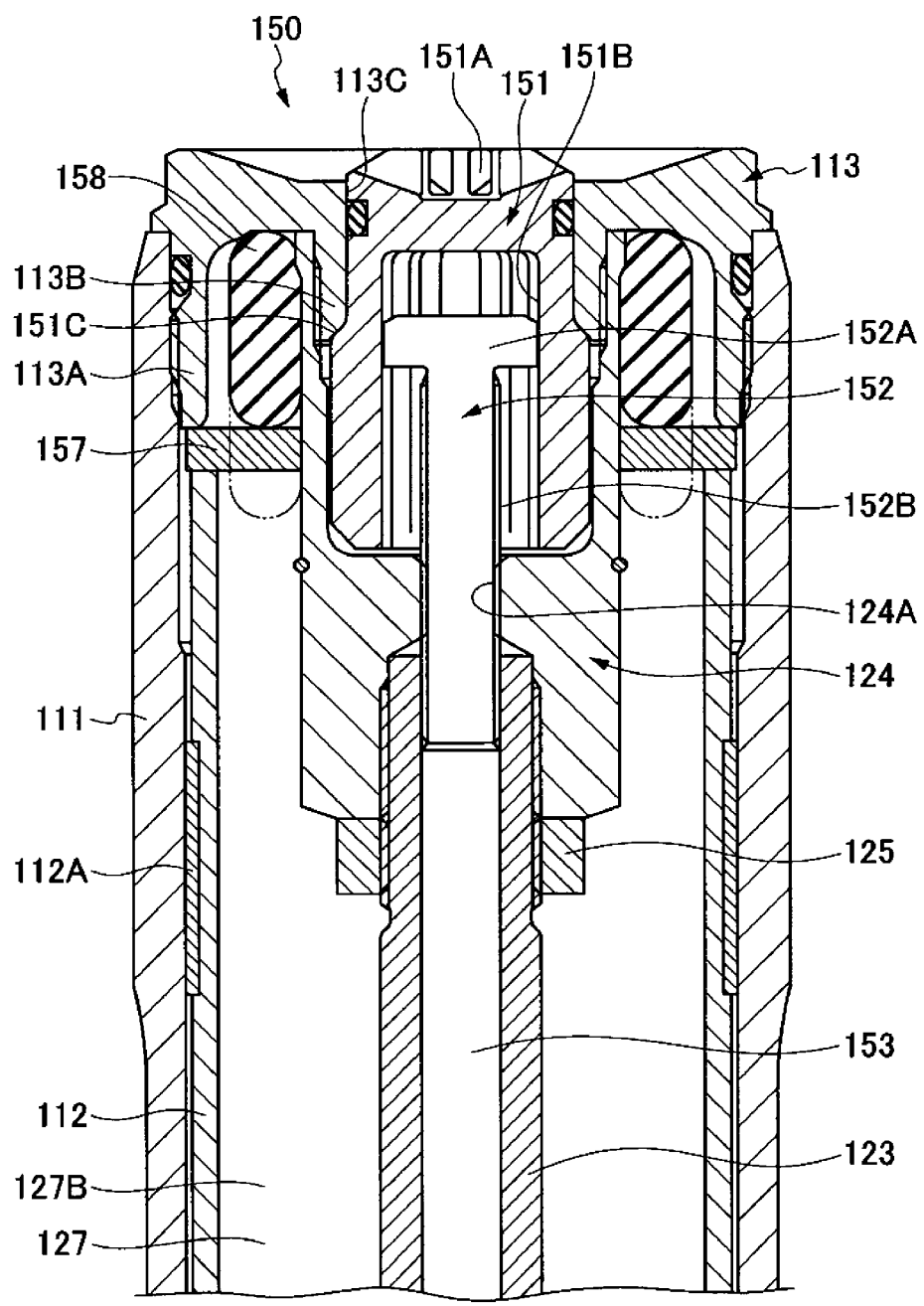
FIG. 12 is a sectional view of an upper part of FIG. 9.

As shown in FIG. 12, in the spring load adjusting device 150, an adjuster 151 is pivotally supported in a sealed state created by an O ring in a pivot hole 113C provided in an inner cylinder portion 113B of the cap 113 in a penetrating manner. The adjuster 151 has an operating portion 151A at an upper end facing the outside and a non-circular hole 151B with a square hole shape or the like which opens at a lower end facing the side of the oil reservoir chamber 127. The adjuster 151 is attached by insertion into the pivot hole 113C of the inner cylinder portion 113B of the cap 113 from the side of the oil reservoir chamber 127 and, in a state where an outer circumferential flange 151C of the adjuster 151 is butted against a lower end surface of the inner cylinder portion 113B of the cap 113, the adjuster 151 is prevented from detaching and is held by an upward depression of the coupling cylinder 124 which is fixed by being screwed into an outer circumferential screw portion of the inner cylinder portion 113B of the cap 113 from the side of the oil reservoir chamber 127.

In the spring load adjusting device 150, a non-circular head portion 152A with a square head shape or the like of an adjusting bolt 152 is engaged with the non-circular hole 151B of the adjuster 151 so that the non-circular head portion 152A of the adjusting bolt 152 becomes non-rotatable but movable in an axial direction. In addition, a threaded shaft 152B of the adjusting bolt 152 is screwed into a screw hole 124A of the coupling cylinder 124 that is substantially integrated with the cap 113. The screw hole 124A is provided on the coupling cylinder 124 halfway between the upward depression and the downward screw hole described earlier. When the adjuster 151 rotates due to an operating force applied to the operating portion 151A, the adjusting bolt 152 screwingly moves up and down in the screw hole 124A of the coupling cylinder 124 while being prevented from rotating by the non-circular hole 151B of the adjuster 151.

In the spring load adjusting device 150, a lower end surface of the threaded shaft 152B of the adjusting bolt 152 abuts an upper end surface of the push rod 153 penetrating into a hollow portion of the hollow rod 123. Accordingly, the adjusting bolt 152 which is moved up and down by the rotation of the adjuster 151 abuts the upper end surface of the push rod 153, and a lower end portion of the push rod 153 which protrudes from the hollow portion of the hollow rod 123 into the piston side oil chamber 133B pressurizes the suspension spring 126 via an upper spring bearing 154. The suspension spring 126 is interposed between the upper spring bearing 154 and the valve housing 143 of the bottom valve device 140, and the adjuster 151 adjusts a spring load of the suspension spring 126 by the up-and-down motion of the push rod 153. The hydraulic shock absorber 100 absorbs an impact force that is received from the road surface during driving of a vehicle with a stretching vibration of the suspension spring 126.

With the spring load adjusting device 150, due to a reaction force of compression of the suspension spring 126, the upper spring bearing 154 constantly abuts the lower end surface of the push rod 153 and the upper end surface of the push rod 153 constantly abuts the lower end surface of the threaded shaft 152B of the adjusting bolt 152.

Moreover, as shown in FIG. 10, the upper spring bearing 154 is constituted by a spring bearing main body 161 arranged on an upper end portion of the suspension spring 126 and a joint 162 fitted to and locked by a central locking hole 161K of the spring bearing main body 161. In the spring bearing main body 161, a lower end surface of a cylinder portion 161A having a ceilinged cylindrical shape is seated on an upper end surface of the suspension spring 126. The spring bearing main body 161 has an oil path 161R penetrating to the inside and outside of the cylinder portion 161A. In the spring bearing main body 161, a fitting outer circumferential surface 162A of the joint 162 is fitted to the straight central locking hole 161K that opens on a central axis of an upper surface 161C of a ceiling portion 161B, an installation plane 162B of the joint 162 is brought into close contact with the upper surface 161C, and the joint 162 is locked by a stopper ring 163 engaged with the fitting outer circumferential surface 162A of the joint 162 protruding from the central locking hole 161K of the spring bearing main body 161 so that the joint 162 can be prevented from detaching by the central locking hole 161K. In addition, the lower end surface of the push rod 153 is in colliding contact with a central depression 162K of the joint 162 of the upper spring bearing 154 to enable pressurization of the suspension spring 126.

As shown in FIG. 12, in the hydraulic shock absorber 100, a stopper rubber 158 which is abutted by the upper end portion of the inner tube 112 via a washer 157 at a maximum compression stroke is fastened to a bottom surface of the annular depression between the outer cylinder portion 113A and the inner cylinder portion 113B of the cap 113, and the maximum compression stroke is restricted by the stopper rubber 158.

Figure 11:
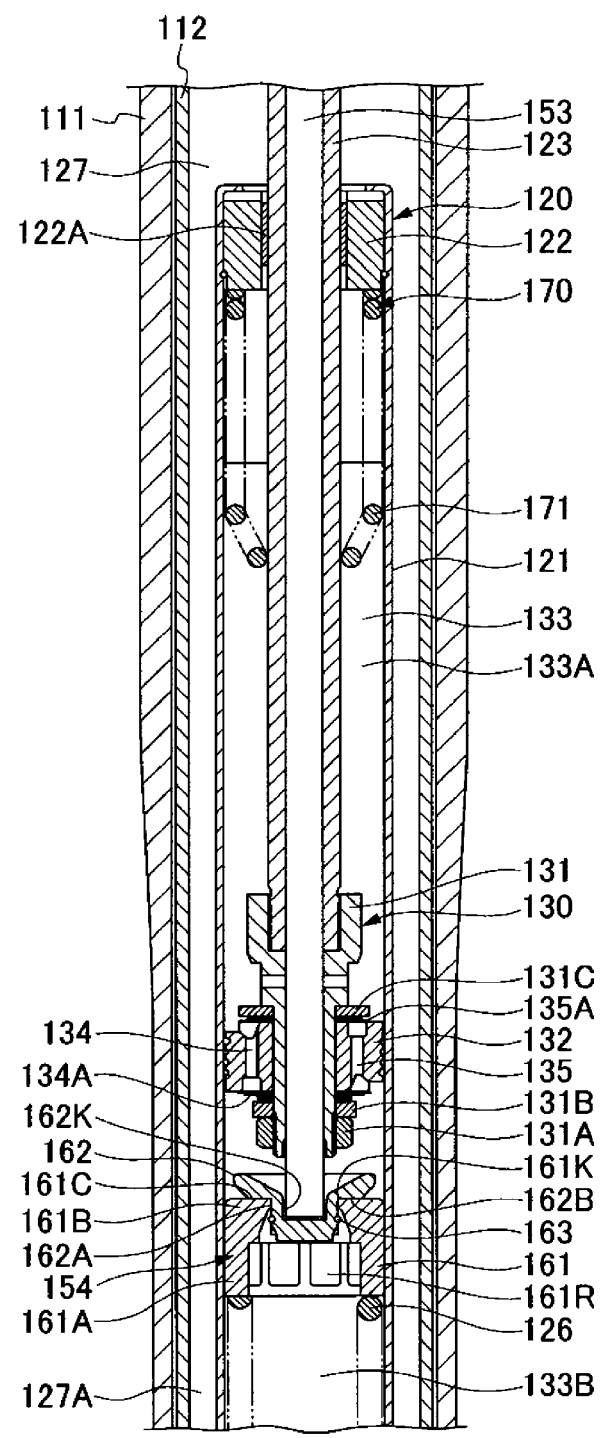
FIG. 11 is a sectional view of an intermediate part of FIG. 9.

As shown in FIG. 11, in the hydraulic shock absorber 100, stopper means 170 is provided around the hollow rod 123 in the rod side oil chamber 133A inside the damper cylinder 121. Upon maximum tension, the hydraulic shock absorber 100 causes the stopper means 170 provided around the hollow rod 123 to abut the rod guide 122 of the damper cylinder 121 to restrict a maximum tension stroke. In the present embodiment, a rebound spring 171 that is supported from below by the piston holder 131 fixedly attached by insertion to a tip portion of the hollow rod 123 is used as the stopper means 170. Upon maximum tension of the hydraulic shock absorber 100, a lower surface of the rod guide 122 of the damper cylinder 121 pressurizes the rebound spring 171 with an upper surface of the piston holder 131 to restrict a maximum tension stroke. Alternatively, the rebound spring 171 may be fixed such as by being attached to the lower surface of the rod guide 122 or may be placed on the upper surface of the piston holder 131.

According to the present embodiment, the following operational advantages can be produced.

(a) A spring load adjusting device 150 is configured such that an adjuster 151 is provided at an upper end portion of an outer tube 111, a push rod 153 that is moved up and down by the adjuster 151 is penetrated into a hollow portion of a hollow rod, a suspension spring 126 is pressurized by the push rod 153 that protrudes from the hollow portion of the hollow rod to the inside of an inner tube 112, and a spring load of the suspension spring 126 can be adjusted by the up-and-down motion of the push rod 153 caused by the adjuster 151.

Accordingly, even if the push rod 153 moves up and down relative to the outer tube 111 during adjustment of a spring load by the adjuster 151, there is no up-and-down motion of the hollow rod. Therefore, stopper means 170 provided around the hollow rod so as to restrict a maximum tension stroke does not move up and down relative to the outer tube 111 during adjustment of a spring load and, as a result, total fully-stretched lengths of the outer tube 111 and the inner tube 112 remain unchanged.

Moreover, the present embodiment also produces the operational advantages (b) to (e) described earlier with respect to the first embodiment.

While embodiments of the present invention have been described using specific terms with reference to the drawings, it is to be understood that specific configurations of the present invention are not limited to these embodiments and that the present invention covers all design changes and the like which do not constitute departures from the spirit and scope of the present invention. For example, the spring load adjusting device according to the present invention is not limited to a configuration in which a suspension spring is pressurized by a spring bearing provided on a tip portion of a push rod protruding from a hollow portion of a hollow rod, and a configuration may be adopted in which a suspension spring is pressurized by a spring bearing fixed to an intermediate portion of a push rod protruding from a hollow portion of a hollow rod.

The present invention provides a hydraulic shock absorber in which a vehicle body side tube and a wheel side tube are slidably fitted to each other; a hollow rod mounted to the vehicle body side tube is inserted inside the wheel side tube; and a suspension spring is arranged inside the wheel side tube, the hydraulic shock absorber including a spring load adjusting device that adjusts a spring load of the suspension spring, wherein stopper means for restricting a maximum tension stroke is provided around the hollow rod inside the vehicle body side tube and the wheel side tube, and the spring load adjusting device is configured such that an adjuster is provided at an upper end portion of the vehicle body side tube, a push rod that is moved up and down by the adjuster is penetrated into a hollow portion of the hollow rod, the suspension spring is pressurized by the push rod that protrudes from the hollow portion of the hollow rod to the inside of the wheel side tube, and the spring load of the suspension spring can be adjusted by the up-and-down motion of the push rod caused by the adjuster. Accordingly, during adjustment of a spring load by an adjuster, total fully-stretched lengths of an outer tube and an inner tube remain unchanged and the adjuster is prevented from protruding from an upper surface of a cap.

EXPLANATION OF REFERENCE NUMERALS 10A, 10B hydraulic shock absorber
11 outer tube (vehicle body side tube)
12 inner tube (wheel side tube)
13 cap
13C pivot hole
18 oil reservoir chamber
19 partition wall member
21 operating oil chamber
21A rod side oil chamber
21B piston side oil chamber
22 oil reservoir chamber
23 hollow rod
24 coupling cylinder
24A screw hole
26 piston
30 spring load adjusting device
31 adjuster
31B non-circular hole
32 adjusting bolt
32A non-circular head portion
32B threaded shaft
33 push rod
33A outer circumferential groove
34 spring bearing
35 suspension spring
50 stopper means
51 stopper ring
52 spring bearing
53 rebound spring
61 spring bearing main body
61K central locking hole
62 joint
62C central coupling hole
64 annular ring
100 hydraulic shock absorber
111 outer tube (vehicle body side tube)
112 inner tube (wheel side tube)
113 cap
113C pivot hole
120 damper
121 damper cylinder
122 rod guide
123 hollow rod
124 coupling cylinder
124A screw hole
126 suspension spring
127 oil reservoir chamber
132 piston
150 spring load adjusting device
151 adjuster
151B non-circular hole
152 adjusting bolt
152A non-circular head portion
152B threaded shaft
153 push rod
153A outer circumferential groove
154 spring bearing
170 stopper means
171 rebound spring

What is claimed is:

1. A hydraulic shock absorber in which a vehicle body side tube and a wheel side tube are slidably fitted to each other;
a hollow rod mounted to the vehicle body side tube is inserted inside the wheel side tube;
and a suspension spring is arranged inside the wheel side tube,
the hydraulic shock absorber comprising a spring load adjusting device that adjusts a spring load of the suspension spring, wherein
stopper means for restricting a maximum tension stroke is provided around the hollow rod inside the vehicle body side tube and the wheel side tube, and the spring load adjusting device is configured such that an adjuster is provided at an upper end portion of the vehicle body side tube, a push rod that is moved up and down by the adjuster is penetrated into a hollow portion of the hollow rod, the suspension spring is pressurized by the push rod that protrudes from the hollow portion of the hollow rod to the inside of the wheel side tube, and the spring load of the suspension spring can be adjusted by the up-and-down motion of the push rod caused by the adjuster.

2. A hydraulic shock absorber in which a vehicle body side tube and a wheel side tube are slidably fitted to each other;

a hollow rod mounted to the vehicle body side tube is inserted into an operating oil chamber inside the wheel side tube, a piston that slidably moves in the operating oil chamber is provided at a tip portion of the hollow rod, the operating oil chamber is partitioned by the piston on both sides of the piston into a rod side oil chamber that houses the hollow rod and a piston side oil chamber that does not house the hollow rod;

and a suspension spring is arranged in the piston side oil chamber inside the wheel side tube, the hydraulic shock absorber comprising a spring load adjusting device that adjusts a spring load of the suspension spring, wherein stopper means for restricting a maximum tension stroke is provided around the hollow rod inside the vehicle body side tube and the wheel side tube, and the spring load adjusting device is configured such that an adjuster is provided at an upper end portion of the vehicle body side tube, a push rod that is moved up and down by the adjuster is penetrated into a hollow portion of the hollow rod, the suspension spring is pressurized by the push rod that protrudes from the hollow portion of the hollow rod into the piston side oil chamber, and the spring load of the suspension spring can be adjusted by the up-and-down motion of the push rod caused by the adjuster.

3. A hydraulic shock absorber in which an inner tube that is a wheel side tube is slidably fitted into an outer tube that is a vehicle body side tube;

a partition wall member is provided on an inner circumference of the inner tube such that an operating oil chamber is defined below the partition wall member and an oil reservoir chamber is defined above the partition wall member;

a hollow rod mounted to the outer tube is penetrated through the partition wall member and inserted into the operating oil chamber, a piston that slidably moves in the operating oil chamber is provided at a tip portion of the hollow rod, and the operating oil chamber is partitioned by the piston on both sides of the piston into a rod side oil chamber that houses the hollow rod and a piston side oil chamber that does not house the hollow rod;

and a suspension spring is arranged in the piston side oil chamber inside the inner tube, the hydraulic shock absorber comprising a spring load adjusting device that adjusts a spring load of the suspension spring, wherein stopper means is provided around the hollow rod in the rod side oil chamber inside the inner tube so that, upon maximum tension, the stopper means provided around the hollow rod abuts the partition wall member to thereby enable a maximum tension stroke to be restricted, and the spring load adjusting device is configured such that an adjuster is provided at an upper end portion of the outer tube, a push rod that is moved up and down by the adjuster is penetrated into a hollow portion of the hollow rod, the suspension spring is pressurized by the push rod that protrudes from the hollow portion of the hollow rod into the piston side oil chamber, and the spring load of the suspension spring can be adjusted by the up-and-down motion of the push rod caused by the adjuster.

4. A hydraulic shock absorber in which a vehicle body side tube and a wheel side tube are slidably fitted to each other;

a hollow rod mounted to the vehicle body side tube is inserted into an operating oil chamber of a damper cylinder erected in the wheel side tube, a piston that slidably moves in the piston on both sides of the piston into a rod side oil chamber that houses the hollow rod and a piston side oil chamber that does not house the hollow rod;

and a suspension spring is arranged in the piston side oil chamber inside the damper cylinder, the hydraulic shock absorber comprising a spring load adjusting device that adjusts a spring load of the suspension spring, wherein stopper means is provided around the hollow rod in the rod side oil chamber inside the damper cylinder so that, upon maximum tension, the stopper means provided around the hollow rod abuts a rod guide of the damper cylinder to thereby enable a maximum tension stroke to be restricted, and the spring load adjusting device is configured such that an adjuster is provided at an upper end portion of the vehicle body side tube, a push rod that is moved up and down by the adjuster is penetrated into a hollow portion of the hollow rod, the suspension spring is pressurized by the push rod that protrudes from the hollow portion of the hollow rod to the inside of the wheel side tube, and the spring load of the suspension spring can be adjusted by the up-and-down motion of the push rod caused by the adjuster.

5. The hydraulic shock absorber according to claim 1, wherein an upper end portion of the hollow rod is fixed to a cap that is fixed to an upper end opening of the vehicle body side tube, the adjuster is pivotally supported by a pivot hole of the cap, a non-circular head portion of an adjusting bolt is engaged with a non-circular hole of the adjuster so as to be non-rotatable but movable in an axial direction, a threaded shaft of the adjusting bolt is screwed into a screw hole of a coupling cylinder, the coupling cylinder being substantially integrated with the cap, and a lower end surface of the threaded shaft of the adjusting bolt abuts an upper end surface of the push rod provided in the hollow portion of the hollow rod.

6. The hydraulic shock absorber according to claim 1, wherein the stopper means provided around the hollow rod is constituted by a rebound spring that is back-supported by a spring bearing supported by an outer circumference of the hollow rod.

7. The hydraulic shock absorber according to claim 1, wherein an annular ring is attached with play in an outer circumferential groove of the push rod, and the annular ring of the push rod is engaged with a coupling hole of a spring bearing provided at an upper end portion of the suspension spring.

8. The hydraulic shock absorber according to claim 7, wherein the spring bearing is made up of a spring bearing main body placed on the upper end portion of the suspension spring and a joint locked by a locking hole of the spring bearing main body, and the coupling hole is formed in the joint.

9. The hydraulic shock absorber according to claim 2, wherein an upper end portion of the hollow rod is fixed to a cap that is fixed to an upper end opening of the vehicle body side tube, the adjuster is pivotally supported by a pivot hole of the cap, a non-circular head portion of an adjusting bolt is engaged with a non-circular hole of the adjuster so as to be non-rotatable but movable in an axial direction, a threaded shaft of the adjusting bolt is screwed into a screw hole of a coupling cylinder, said coupling cylinder substantially integrated with said cap, and a lower end surface of the threaded shaft of the adjusting bolt abuts an upper end surface of the push rod provided in the hollow portion of the hollow rod.

10. The hydraulic shock absorber according to claim 2, wherein the stopper means provided around the hollow rod is constituted by a rebound spring that is back-supported by a spring bearing supported by an outer circumference of the hollow rod.

11. The hydraulic shock absorber according to claim 2, wherein an annular ring is attached with play in an outer circumferential groove of the push rod, and the annular ring of the push rod is engaged with a coupling hole of a spring bearing provided at an upper end portion of the suspension spring.

12. The hydraulic shock absorber according to claim 3, wherein an upper end portion of the hollow rod is fixed to a cap that is fixed to an upper end opening of the vehicle body side tube, the adjuster is pivotally supported by a pivot hole of the cap, a non-circular head portion of an adjusting bolt is engaged with a non-circular hole of the adjuster so as to be non-rotatable but movable in an axial direction, a threaded shaft of the adjusting bolt is screwed into a screw hole of a coupling cylinder, said coupling cylinder substantially integrated with said cap, and a lower end surface of the threaded shaft of the adjusting bolt abuts an upper end surface of the push rod provided in the hollow portion of the hollow rod.

13. The hydraulic shock absorber according to claim 3, wherein the stopper means provided around the hollow rod is constituted by a rebound spring that is back-supported by a spring bearing supported by an outer circumference of the hollow rod.

14. The hydraulic shock absorber according to claim 3, wherein an annular ring is attached with play in an outer circumferential groove of the push rod, and the annular ring of the push rod is engaged with a coupling hole of a spring bearing provided at an upper end portion of the suspension spring.

15. The hydraulic shock absorber according to claim 4, wherein an upper end portion of the hollow rod is fixed to a cap that is fixed to an upper end opening of the vehicle body side tube, the adjuster is pivotally supported by a pivot hole of the cap, a non-circular head portion of an adjusting bolt is engaged with a non-circular hole of the adjuster so as to be non-rotatable but movable in an axial direction, a threaded shaft of the adjusting bolt is screwed into a screw hole of a coupling cylinder, said coupling cylinder substantially integrated with said cap, and a lower end surface of the threaded shaft of the adjusting bolt abuts an upper end surface of the push rod provided in the hollow portion of the hollow rod.

16. The hydraulic shock absorber according to claim 4, wherein the stopper means provided around the hollow rod is constituted by a rebound spring that is back-supported by a spring bearing supported by an outer circumference of the hollow rod.

17. The hydraulic shock absorber according to claim 4, wherein an annular ring is attached with play in an outer circumferential groove of the push rod, and the annular ring of the push rod is engaged with a coupling hole of a spring bearing provided at an upper end portion of the suspension spring.

18. The hydraulic shock absorber according to claim 5, wherein the stopper means provided around the hollow rod is constituted by a rebound spring that is back-supported by a spring bearing supported by an outer circumference of the hollow rod.

19. The hydraulic shock absorber according to claim 5, wherein an annular ring is attached with play in an outer circumferential groove of the push rod, and the annular ring of the push rod is engaged with a coupling hole of a spring bearing provided at an upper end portion of the suspension spring.

20. The hydraulic shock absorber according to claim 6, wherein an annular ring is attached with play in an outer circumferential groove of the push rod, and the annular ring of the push rod is engaged with a coupling hole of a spring bearing provided at an upper end portion of the suspension spring.

\* \* \* \* \*